US009418218B2

(12) United States Patent
Walters et al.

(10) Patent No.: US 9,418,218 B2
(45) Date of Patent: Aug. 16, 2016

(54) DYNAMIC RENDERING OF A DOCUMENT OBJECT MODEL

(71) Applicant: Intermedia.net, Inc., Mountain View, CA (US)

(72) Inventors: Richard John Walters, Benson (GB); Joel Augustus Laird, North Somerset (GB); Simon David Knott, Bristol (GB)

(73) Assignee: Intermedia.net, Inc., Mountain View, CA (US)

( * ) Notice: Subject to any disclaimer, the term of this patent is extended or adjusted under 35 U.S.C. 154(b) by 0 days.

(21) Appl. No.: 14/940,434

(22) Filed: Nov. 13, 2015

(65) Prior Publication Data

US 2016/0140338 A1    May 19, 2016

Related U.S. Application Data

(62) Division of application No. 13/774,752, filed on Feb. 22, 2013, now abandoned.

(30) Foreign Application Priority Data

Mar. 23, 2012 (GB) .................................. 1205117.3

(51) Int. Cl.
*G06F 21/50* (2013.01)

(52) U.S. Cl.
CPC ............ *G06F 21/50* (2013.01); *G06F 2221/03* (2013.01)

(58) Field of Classification Search
None
See application file for complete search history.

(56) References Cited

U.S. PATENT DOCUMENTS

| 8,341,529 | B1* | 12/2012 | Li | G06F 17/30861 715/741 |
| 8,667,480 | B1* | 3/2014 | Sigurdsson | G06F 8/65 717/168 |
| 2003/0037253 | A1* | 2/2003 | Blank | G06F 21/10 726/27 |
| 2004/0187029 | A1* | 9/2004 | Ting | G06F 21/32 726/5 |
| 2007/0192485 | A1* | 8/2007 | McMahan | G06F 21/56 709/225 |
| 2007/0234217 | A1* | 10/2007 | Miller | H04L 12/2697 715/738 |
| 2008/0208868 | A1* | 8/2008 | Hubbard | G06F 17/30867 |
| 2008/0301766 | A1* | 12/2008 | Makino | G06F 21/51 726/1 |
| 2012/0066583 | A1* | 3/2012 | Priestley | G06F 9/542 715/234 |
| 2013/0246996 | A1* | 9/2013 | Duggal | G06F 8/35 717/104 |
| 2014/0075563 | A1* | 3/2014 | Simpson | G06F 21/577 726/25 |
| 2015/0154402 | A1* | 6/2015 | Arbabi | G06F 21/577 726/25 |

* cited by examiner

*Primary Examiner* — Michael R Vaughan
(74) *Attorney, Agent, or Firm* — Schwegman Lundberg & Woessner, P.A.

(57) ABSTRACT

The present application relates to a computer having a processor configured to execute a set of instructions to render a customized version of a restricted document object model. A restricted element in a document object model is identified and at least one rule associated with the restricted element is accessed. The at least one rule is applied to the restricted element to generate a modified document object model which is then rendered. A related computer-implemented method is also covered by the present application. The present application relates to server-side authentication techniques; content filtering based on user-specific and context-based requirements; and audit trail techniques.

20 Claims, 16 Drawing Sheets

DYNAMIC RENDERING OF A DOCUMENT OBJECT MODEL

RELATED APPLICATIONS

This application is a divisional of U.S. patent application Ser. No. 13/744,752, filed Feb. 22, 2013, which application claims the benefit of foreign priority to GB 1205117.3, filed Mar. 23, 2012, the contents of which are hereby incorporated by reference in their entireties.

TECHNICAL FIELD

The present invention relates to a computer configured to perform dynamic rendering of a document object model. Aspects of the invention relate to a computer, a machine-readable storage medium and a related method.

BACKGROUND OF THE INVENTION

It is increasingly common to utilise cloud computing techniques to provide software applications. These applications are accessed over the internet and often circumvent standard corporate security protocols and do not offer an audit capability. Accordingly, there is an increasing need to monitor access to web pages and to control the information available to users.

It is against this background that the present invention has been conceived. Embodiments of the invention may provide a computer, a machine-readable storage medium and a related method which overcome or improve one or more of the shortcomings of known systems. Other aims and advantages of the invention will become apparent from the following description, claims and drawings.

SUMMARY OF THE INVENTION

Aspects of the present invention relates to a computer, a machine-readable storage medium and a method.

According to a first aspect of the present invention, there is provided a computer comprising:
 a processor configured to execute instructions;
 instructions that, when executed by the processor, direct the computer to perform operations to render a customised version of a restricted document object model, the Operations comprising:
  (a) identifying a restricted element in a document object model;
  (b) accessing at least one rule associated with the restricted element;
  (c) applying said at least one rule to the identified element to generate a modified document object model; and
  (d) rendering said modified document object model.

The computer can identify one or more restricted elements in a document object model and apply said at least one rule to modify the document object model. The modified document object model can then be rendered on the computer. The appearance of the document object model can be modified, for example to hide or obfuscate information contained in the element. The structure of the document object model can be modified, for example to remove an embedded link. The appearance of the rendered document object model can remain unchanged when the functionality is altered.

The document object model can comprise a plurality of elements. One or more of said elements in the document object Model can be classified as being restricted. The step of applying one or more of said rules can comprise modifying at least one of said restricted elements. Some or all of the elements within the document object model can be modified.

The document object model can be a part of a web page. One or more of the document object models making up a web page can be classified as being restricted. The rendered version of the web page can comprise at least one modified document object model and optionally at least one unmodified document object model.

Alternatively, the document object model can define a complete web page. The document object model can be identified as being restricted if the web page is restricted.

A check can be performed to determine when a new document object model has been accessed.

The restricted element(s) can be defined with reference to a restricted web page. The step of identifying a restricted document object model can comprise looking up an identifier, such as a uniform resource locator (URL), in a custom table defined for that user. Upon receipt of a navigation request, the URL of the requested document object model can be compared to a look-up table. The look-up table can be defined for a particular user or group of users. Equally, the look-up table can be defined for a particular geo-location (determined from an active ip address); class of rendering device (for example, telephone, computer etc.); timings (for example, time of day), etc.

The operations can include the step of determining whether one or more of said rules is applicable. This step can be repeated for each restricted element within the document object model. The steps of applying one or more applicable rules and rendering the first modified element of the document object model can be repeated for each element of the document object model to which one or more of said rules is determined as being applicable. If one or more of said rules is not applicable to an element within the document object model, the operations can comprise rendering the document object model in an unmodified form.

The operations can further comprise identifying the user. The at least one rule and/or website restrictions can be customised for each user or group of users. The operations can comprise identifying the user, for example based on log-in details. The operations can include the step of looking up access rights for the identified user.

Alternatively, or in addition, the operations can comprise identifying contextual data and applying at least one rule and/or website restriction based on said contextual data. The contextual data can include one or more of the following: (i) the geographical location of a remote terminal used to access the application over said network; (ii) the type of device used to access the application over the network; (iii) the type of connection used to access the application over the network; and (iv) temporal restrictions, for example based on the time of day and/or date and/or the day of the week.

The at least one rule can be fetched from a database. The database can be stored on said computer or on a remote server.

The steps of applying the rules and modifying said document object model can be performed as said first document object model is loading, rather than after it has loaded. The modified document object model can be rendered without previously having rendered the (unmodified) document object model. Thus, the source document object model is not rendered. This approach can help to avoid flickering which may otherwise occur when an element is displayed and then removed. A plurality of document object models can be modified and the modified document object models rendered simultaneously.

The at least one rule can provide one or more of the following functions upon the restricted element: (i) hide said element from view; (ii) remove a portion or all of said element from the document object model; (iii) disable functionality associated with said element; (iv) obfuscate the contents of said element; (v) unwrap a link embedded within said element; and (vi) register a screenshot of said document object model in its rendered form. The functions could equally change font colour, or reverse the contents of the text. The at least one rule could be applied to a complete document object model.

The operations can further comprise operating a browser through which the restricted web site is accessed. The at least one rule can disable at least one of the following functions of said browser: (i) printing functionality; (ii) save functionality; (iii) viewing of the web page source; and (iv) copy functions. Any function of the browser which has not been disabled by said at least one rule can be positively enabled. This helps to avoid the potential scenario whereby browser functionality is erroneously inhibited, for example when a user selects different tabs in the browser.

The operations can further comprise determining whether said at least one rule has been applied to said rest ed element and issuing a notification.

In a further aspect of the present invention there is provided a machine-readable storage medium having machine-executable instructions encoded thereon that upon execution by a processor direct a computer to perform operations comprising:
   (a) identifying a restricted element in a document object model;
   (b) accessing at least one rule associated with the restricted element;
   (c) applying said at least one rule to said restricted element to generate a modified document object model; and
   (d) rendering said modified document object model.

The operations can further comprise the step of determining which of said at least one rule is applicable to said document object model. The steps of applying the at least one rule and rendering said modified element can be repeated for a plurality of document object models.

The application of one or more applicable rules can be performed as said document object model is loading. This technique can avoid flickering resulting from rendering the original (unmodified) document object model and then replacing it with a modified document object model. A plurality of modified document object models can be generated for rendering simultaneously. The modified document object models can, for example, be stored in a memory ready for rendering.

The at least one rule can provide one or more of the following functions upon the restricted element: (i) hide said element from view; (ii) remove a portion or all of said element from the document object model; (iii) disable functionality associated with said element; (iv) obfuscate the contents of said element; (v) unwrap a link embedded within said element; and (vi) register a screenshot of said document object model in its rendered form.

The operations can further comprise operating a browser through which the restricted web site is accessed. The at least one rule can disable at least one of the following functions of said browser: (i) printing functionality; (ii) save functionality; (iii) viewing of the web page source; and (iv) copy functions. Any function of the browser which has not been disabled by said at least one rule can be positively enabled. This helps to avoid the potential scenario whereby functionality is inhibited, for example when user selects different tabs.

In a still further aspect of the present invention there is provided a method of rendering a customised version of a restricted document object model, the method comprising:
   (a) identifying a restricted element in a document object model;
   (b) accessing a set of rules associated with the restricted element;
   (c) applying one or more applicable rules to said restricted element to generate a modified document object model; and
   (d) rendering said modified document object model.

The method can further comprise the step of determining which of said rules is applicable. The method can comprise repeating steps (c) and (d) for a plurality of document object models.

The document object model can form a part of a web page, or a complete web page.

According to a still further aspect of the present invention there is provided a server comprising:
   a processor configured to execute instructions;
   instructions that, when executed by the processor, direct the server to perform operations to authenticate a user to an application, the operations comprising:
   (a) storing user login information on the server;
   (b) identifying navigation on a remote terminal to an application requiring user authentication;
   (c) introducing said user login information stored on the server into the application at said remote terminal.

The user authentication can thereby be performed by the server, without the user having to input the login information at the remote terminal. Rather, the server detects when the user has navigated to an application requiring user authentication and then injects the stored login information into the application.

The application can be accessed over a network, such as the internet. In this arrangement, the application can be accessed from the remote terminal through a web browser. The application can, for example, be operated by a remote server accessed from the remote terminal.

An extension can be provided on the remote terminal to listen for the user navigating to the application. When the extension determines that the user has navigated to the application, a request can be transmitted to the server. The server can be configured to introduce the login information into the application in response to the request from the extension. The server can be configured to introduce the login information into a first browser session, for example a headless browser session. The extension can receive a set of login data from the first browser session upon completion of the login procedure and the login data can then be transmitted to the server. The server can be configured to receive the login data derived from the first browser session. The first browser session can be closed and any login data deleted once the login data has been output to the server. The server can be configured to introduce the login data received from the first browser session into a second browser session operating on the remote terminal.

The server can store one or more sets of user login information for said application. The sets of user login information can correspond to different login profiles for the application. The login profiles can be configured to provide different rights for the user within the application, for example to enable administrator and user functions. The server can be configured to receive a prompt from the remote terminal indicating which login information is to be introduced into the application. The server can respond by outputting the requested set of user login information to the application.

According to a further aspect of the present invention there is provided a computer comprising:

a processor configured to execute instructions;

instructions that, when executed by the processor, direct the computer to perform operations to authenticate a user to an application accessed over a network, the operations comprising:

(a) identifying a request for user login information to the application;

(b) outputting a notification of the request to a remote server;

(c) initiating a first browser session configured to receive user login information from the remote server in response to said notification;

(d) obtaining login data from the first browser session upon completion of the user login; and (e) introducing the login data from the first browser session into a second browser session.

The application can be accessed over the internet, for example through a browser operating on the computer. An extension can operate on the browser to identify the request for user login information and to output the notification to the remote server. The remote server can also be accessed over the internet, for example in the background of a web page.

The first browser session can be a headless session (i.e. a browser without a user interface). The computer can be configured to output the login data from the first browser session to the remote server. The computer can be configured to close the first browser session and optionally to delete the login data from local memory once it has been output to the remote server. The computer can be configured automatically to open the second browser session. The second browser session can be configured to receive the login data directly from the remote server.

Upon identification of the request for user login information, the computer can be configured to output a prompt to a user to select one of a plurality of sets of user login information for said application. The notification output to the remote server can include an identifier of the selected set of the selected user login information.

According to a yet further aspect of the present invention there is provided a computer-implemented method of performing user authentication to an application accessed over a network via a browser, the method comprising:

(a) identifying a request for user login information to the application;

(b) outputting a notification of the request to a remote server;

(c) initiating a first browser session and introducing the user login information from the remote server into said first browser session;

(d) obtaining login data from the first browser session upon completion of the user login; and (e) introducing the login data from the first browser session into a second browser session.

The login data from the first browser session can be output to the remote server. The remote server can then introduce the login data from the first browser session directly into the second browser session.

According to a yet further aspect of the present invention, there is provided a computer comprising:

a processor configured to execute instructions;

instructions that, when executed by the processor, direct the computer to perform operations to generate an audit trail of user actions, the operations comprising:

(a) identifying a document object model event within a browser;

(b) storing audit data relating to the identified document object model event; and (c) transmitting the audit data to a server for storage in an audit trail.

The browser provides access to the internet, for example to provide access to an application operating on a remote server. The document object model event can, for example, comprise a user-triggered event, such as selecting an icon or a button within the document object model; and/or a browser-triggered event, such as loading or modification of the document object model.

The audit data can be captured from one or more predefined document object models, for example to capture a duplicate of part or all of the document object model. Alternatively, the audit data can be captured from one or more configurable document object models, for example a filename or an email address input by a user into the configurable document object model.

According to a yet further aspect of the present invention there is provided a computer-implemented method of generating an audit trail of user actions, the operations comprising:

(a) identifying a document object model event within a browser;

(b) storing audit data relating to the identified document object model event; and (c) transmitting the audit data to a server for storage in an audit trail.

According to a yet further aspect of the present invention there is provided a computer comprising:

a processor configured to execute instructions;

instructions that, when executed by the processor, direct the computer to perform operations to inhibit one or more features or functions of an application accessed over a network, the operations comprising:

(a) identifying user-specific and/or context-based restriction data relating to the application;

(b) providing a user with access to the application over a network; and (c) inhibiting some of the features or functionality of the application based on the restriction data associated with that user.

The instructions can inhibit downloading functionality, for example to prevent data being downloaded from the application. The instructions can hide or obfuscate part or all of the information displayed by said application, for example using the techniques described herein to modify the rendering of a document object model. The user-specific restriction data can be pre-defined, for example by a system administrator.

The context-based restriction data relates to one or more of the following:

(i) the geographical location of a remote terminal used to access the application over said network;

(ii) the type of device used to access the application over the network;

(iii) the type of connection used to access the application over the network; and (iv) temporal restrictions, for example based on the time of day and/or date and/or the day of the week.

According to a yet further aspect of the present invention there is provided a computer-implemented method of inhibiting one or more features or functions of an application accessed over a network, the method comprising:

(a) identifying user-specific and/or context-based restriction data relating to the application;

(b) providing a user with access to the application over a network; and (c) inhibiting some of the features or functionality of the application based on the restriction data associated with that user.

According to a still further aspect of the present invention there is provided a computer comprising:

a processor configured to execute instructions;

instructions that, when executed by the processor, direct the computer to perform operations to control communication between a global namespace and an anonymous namespace within a browser extension; the operations comprising:

(a) sending a first message from the anonymous namespace to a message routing module, the first message opening a communication channel between the anonymous namespace and the message routing module;

(b) sending a second message from the global namespace to the message routing module; and (c) sending a third message from the message routing module to the anonymous namespace through said open communication channel.

According to a yet further aspect of the present invention there is provided a computer-implemented method of controlling communication between a global namespace and an anonymous namespace within a browser extension; the method comprising:

(a) sending a first message from the anonymous namespace to a message routing module, the first message opening a communication channel between the anonymous namespace and the message routing module;

(b) sending a second message from the global namespace to the message routing module; and (c) sending a third message from the message routing module to the anonymous namespace through said open communication channel.

The global namespace can be provided in a background module of the browser extension. The anonymous namespace can be provided in a foreground module of the browser extension. The browser extension can be programmed in JavaScript. The message routing module can be programmed in operative-c.

The first message can comprise one or more of the following: a first unique message identifier; an anonymous namespace identifier (for example an origin/source namespace) for identifying where the first message has originated; and listening data to enable the message routing module to register a listener.

The second message can comprise one or more of the following: a message name; message data; a second unique message identifier; a global namespace identifier for identifying where the second message has originated; a flag to indicate that no response is required; a destination namespace identifier; and a time-stamp.

The first and second messages can be linked by a namespace identifier. A destination namespace in the second message can be matched to an origin/source namespace in the first message.

The third message can comprise part or all of the second message. In certain embodiments, the contents of the third message can be identical to the second message. Thus, the anonymous namespace can appear to receive the second message directly from the global namespace. As a result, the anonymous namespace can receive the second message as if the message routing module does not exist. The message routing module and the related technique have particular application in iOS as there is no mechanism to pass a message between the global and anonymous namespaces.

The message routing module can be configured to establish a connection between said first message and said second message.

The communication channel can be closed after the third message has been sent. The method can comprise re-sending the first message to re-open the communication channel from the anonymous namespace to the message routing module.

The methods described herein can be computer-implemented. The methods can be performed by a computer comprising one or more electronic processors configured to perform a set of instructions. The set of instructions can implemented in hardware or software. The software can be provided in a computer-readable medium or downloaded over a network, such as the internet.

Many of the attendant features of the present invention will be more readily appreciated and understood by reference to the following detailed description of a preferred embodiment considered in connection with the accompanying drawings.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

A system 1 for controlling the rendering of a restricted web page will now be described with reference to the accompanying figures. The system 1 is customised to provide controlled access for a particular user.

Figure 1:
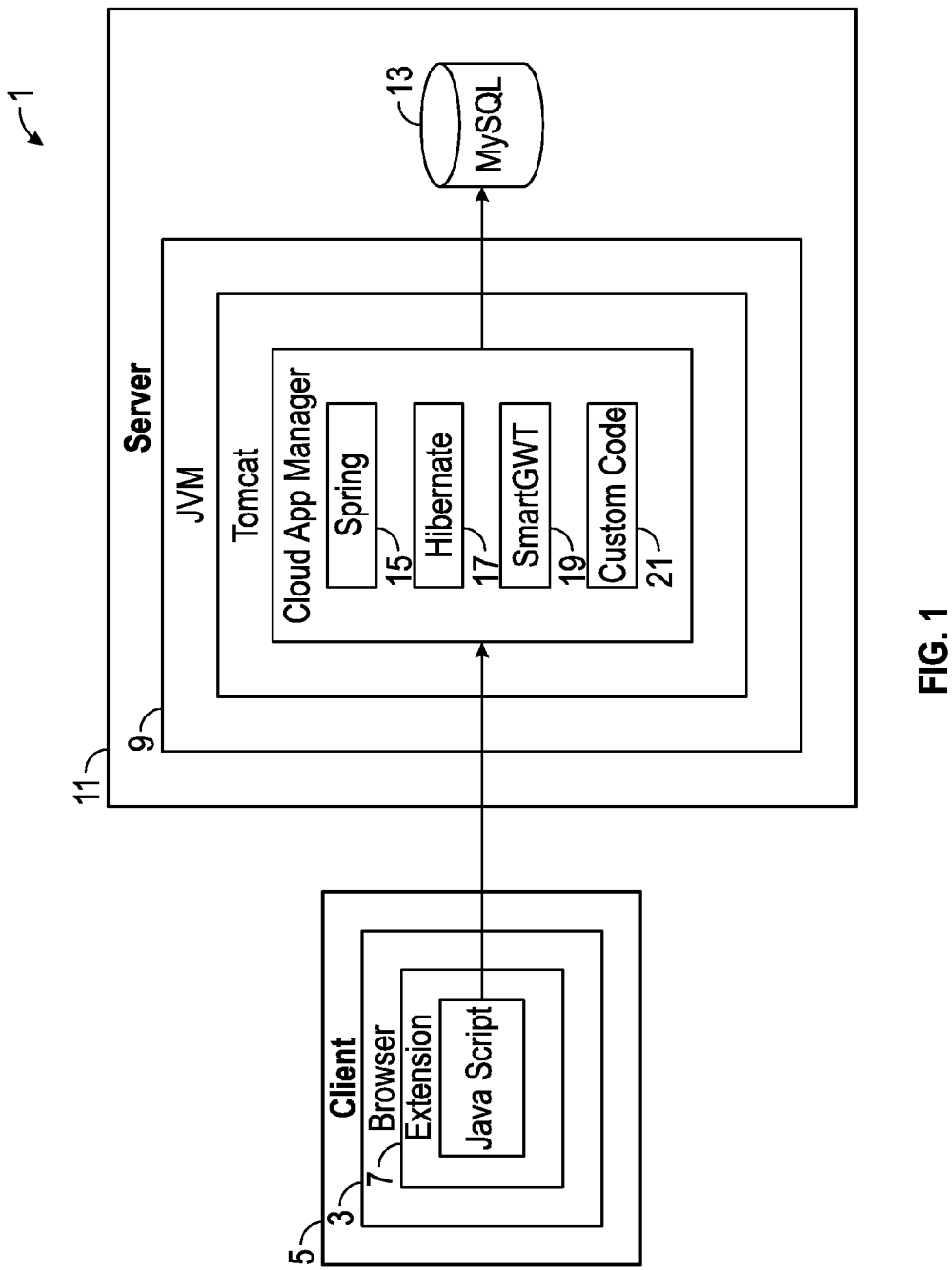
FIG. 1 shows an overview of the system architecture in accordance with the present invention.

As shown in FIG. 1, the system 1 comprises a browser 3 operating on a client computer 5 for accessing web pages over the internet. The web pages can be rendered in one or more tabs opened by the user within the browser 3. The browser 3 operates in conjunction with an extension 7 which loads on the client computer 5 when the browser 3 is opened by a user. As described in more detail herein, the extension 7 identifies restricted web pages and operates to modify the appearance and/or functionality of the web page rendered on the browser 3.

The extension 7 is configured to communicate with a cloud application manager 9 operating on a remote server 11 via a remote communication protocol, such as TCP/IP or HTTP. The cloud application manager 9 is connected to a database 13 (for example an SQL database, such as MySQL or NOSQL) containing user data, including login and authorisation information. The cloud application manager 9 provides a user interface for one or more cloud applications operating over the internet.

The cloud application manager 9 comprises a security and persistence module 15, an abstraction module 17, an administrator module 19 and a custom module 21. The security and persistence module 13 controls user-authentication and transactions with the database 21. The abstraction module 17 is used for abstracting the persistence of data to allow code to be written in a database agnostic fashion. The administrator module 19 provides an administration user interface; and the custom module 21 provides access to a customised server.

The extension 7 communicates with an encryption component and a screenshot capture component operating on the client computer 5. The encryption component performs encryption and decryption of data transferred between the extension 7 and the remote server 11. The data is encrypted with the required encryption algorithm, and subsequently decrypted with the relevant algorithm. The screenshot capture component captures screenshots in response to instructions receive from the extension 7 to provide a register of usage.

Figure 2:
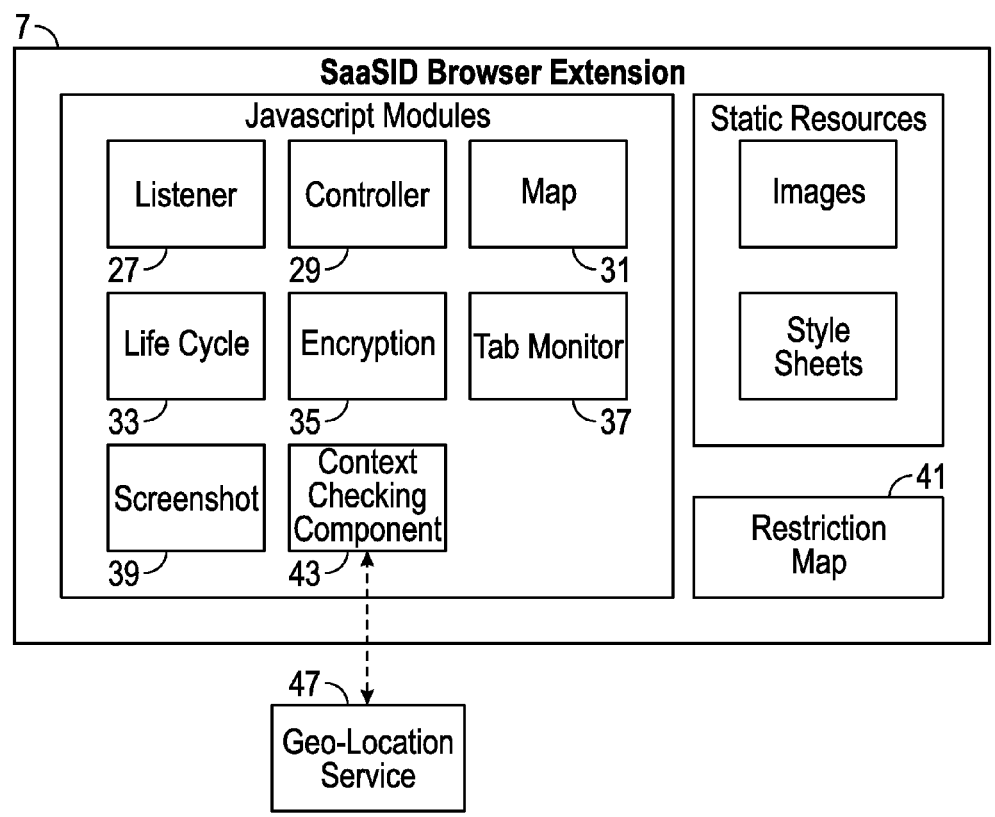
FIG. 2 shows an overview of the plug-in application according to an embodiment of the present invention.

As shown in FIG. 2, the extension 7 comprises a series of JavaScript modules which define JavaScript objects. A listener module 27 contains the functions used for listening to browser-specific API events and key-handling events. A controller module 29 handles the login of the user and directs events, passed by the listener object, to the correct set of business logic. A map module 31 defines a map object which implements a HashMap class. A lifeCycle module 33 holds all pertinent data about events involving the document object model (DOM) lifecycle, including page loading events and DOM modification events. An encryption module contains all logic and code required for encrypting and decrypting data. A tab monitor module 37 contains all functionality for applying monitoring a Document Object Model (DOM) for a tab within the browser 3 and for applying page rules. A screenshot module 39 enables the capture of dimension data, which represents the visible view port of the current tab, along with the subsequent capture of this visible data into screenshots.

As outlined above, the extension 7 initiates when the browser 3 is opened and controls user access to selected cloud applications via the remote server 11. The extension 7 requires a single user log-on and then provides automated log-in to the selected cloud applications. The log-in details (for example username and password) for each of the selected cloud applications could be stored locally on the client computer 5, but in the present embodiment they are stored remotely on the remote server 11 for access by the cloud application manager 9.

The extension 7 builds a user-specific restriction map 41 defining a set of rules which are mapped to restricted domains and URLs (uniform resource locators). The restriction map 41 is stored in local memory on the client computer 5 for access by the extension 7. The restriction map 41 contains the following data for each user:

User identification data, such as username and email address.

Web page rules and rules indicating when the rules should be applied during the page loading lifecycle.

Browser rules for controlling browser functionality, such as copy, save and print, for restricted web applications.

A list of all sites which the user can log into, with a uniquely generated reference for retrieving the login credentials from the server.

The restriction map 41 defines at least one rule which can be applied to a document object model (DOM), which can define part or all of the web page. The rules provided within the restriction map 41 can be applied when the DOM is loading, after it has loaded and also when it changes. These rules can be classified as follows:

DOM Load—All restrictions which should be applied when the DOM is loading.

Page Load—All restrictions which should be applied when the page has fully loaded, such as Screenshot restrictions.

DOM Change/Element Trigger—All restrictions which should be applied every time the DOM changes or when configurable elements are triggered on the page.

The rules provided in the restriction map 41 in each of the above classifications can be defined as follows:

hide—Used to hide DOM elements from the user, without removing them from the document. For example, login pages for Cloud Applications have their login fields hidden so that the user cannot enter data, whilst allowing the plug-in to still use them in the background. This is achieved by setting the stylesheet "display" attribute to "none".

remove—Removes the DOM element from the document.

removeParent—Removes the parent DOM element from the document, which will also remove any child DOM elements. For example, on the Salesforce setup screen for a user profile, to fully remove the link for changing your password it is also necessary to remove the parent bullet point DOM element.

disable—Disables functional DOM elements, such as buttons, without removing them from the visible document. This is achieved by setting the DOM "disable" attribute to "true".

blank—Used to obfuscate data on the screen, for example by replacing the textual data with a number of Xs. For example, obfuscating a column of numbers in a report can be achieved with this restriction.

unwrap—"Unwraps" an HTML link DOM element, by removing the link whilst retaining the content within the link. This can be used to disable links, without disrupting the look-and-feel of the presented HTML document.

screenshot—Registers a screenshot "click" event handler on the targeted DOM element.

trigger—Registers a custom "click" event handler on the targeted DOM element, which will trigger the application of the "DOM Change/Element Trigger" restrictions.

The restriction map 41 also contains rules which can be applied to the browser 3 to inhibit browser functions, such as:

Print—Disables printing functionality via one or more of the following techniques:

i. Browser menus are hidden, by targeting the elements within the Browser's window document, in both menuset and vbox DOM elements.

ii. Browser pop-up menus are hidden, by targeting the elements within the Browser's window document in the popupset DOM elements.
iii. Key triggers are disabled in the Browser's window document.
iv. A custom stylesheet targeting the "Print" media, which hides the DOM body element Save—Disables document and section saving functionality one or more of the following techniques:
i. Menus are hidden, by targeting the elements within the Browser's window document, in both menuset and vbox DOM elements.
ii. Pop-up menus are hidden, by targeting the elements within the Browser's window document in the popupset DOM elements.
iii. Key triggers are disabled in the Browser's window document.

View Source—Disables document and section view source functionality via one or more of the following techniques:
i. Menus are hidden, by targeting the elements within the Browser's window document, in both menuset and vbox DOM elements.
ii. Pop-up menus are hidden, by targeting the elements within the Browser's window document in the popupset DOM elements.
iii. Key triggers are disabled in the Browser's window document.

Copy—Disables the ability to copy content from the page via one or more of the following techniques:
i. Menus are hidden, by targeting the elements within the Browser's window document, in both menuset and vbox DOM elements.
ii. Pop-up menus are hidden, by targeting the elements within the Browser's window document in the popupset DOM elements.
iii. Key triggers are disabled in the Browser's window document.
iv. Copy key press combinations are captured and nullified.
v. Disables the selection of text within the DOM The listener module 27 identifies the loading of a new web page and also identifies when a change occurs to a loaded web page to enable application of the appropriate rules defined in the restriction map 41. When an event is triggered in the browser 3, the listener module 27 is notified. The listener module 27 comprises listeners for registering one or more of the following events:

DOM Listeners—Listeners for events involving DOM loading and content modification.
Page Listeners—Listeners for events involving page loading and rendering.
Tab Listeners—Listeners for events involving tab switching and content modification.
Key Listeners—Listeners for keyboard events.

The operation of the extension 3 will now be described with reference to FIGS. 3 to 6.

Page Change Detected

Figure 3:
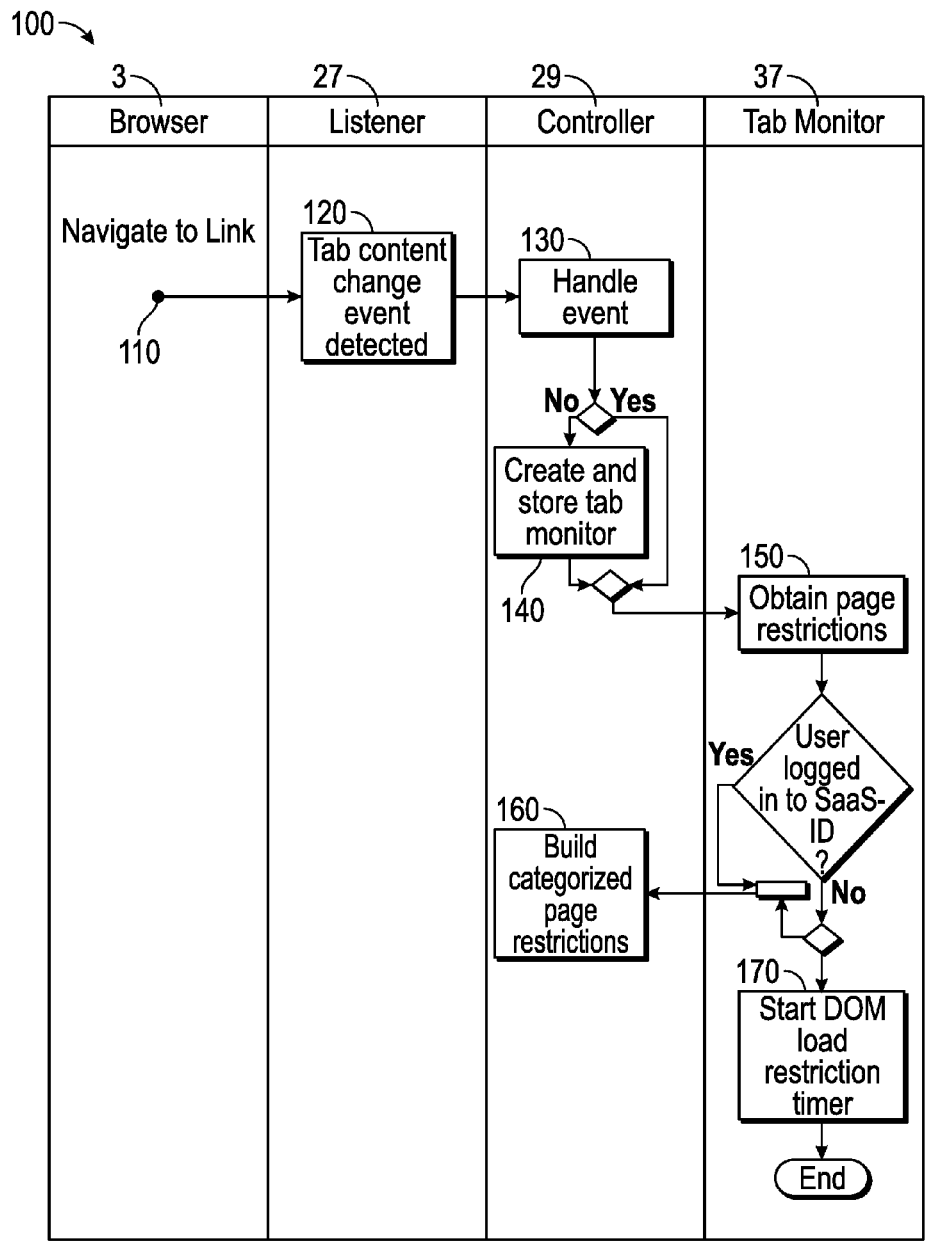
FIG. 3 shows a flow chart representing the process for detecting changes on a web page.

A first flowchart 100 illustrating the system steps implemented when a page change is detected is shown in FIG. 3. When a user navigates to a link in a tab of the browser 3 (Step 110), the listener module 27 is notified of a change in the contents of the tab's DOM (Step 120). The controller module 29 receives the event (Step 130) and, if not already available, creates a tab monitor signal to monitor the tab (Step 140). The tab monitor module 37 accesses page rules from the restriction map 41 (Step 150).

If the user is logged into the extension 7, the controller module 29 applies the page rules accessed form the restriction map 41 (including "DOM Load", "Page Load" and "DOM Change") to the web page (Step 160). The tab monitor module 37 initiates a restriction timer (Step 170) and the page rules are applied periodically, for example with intervals of 100 ms.

Page Load Detected

Figure 4:
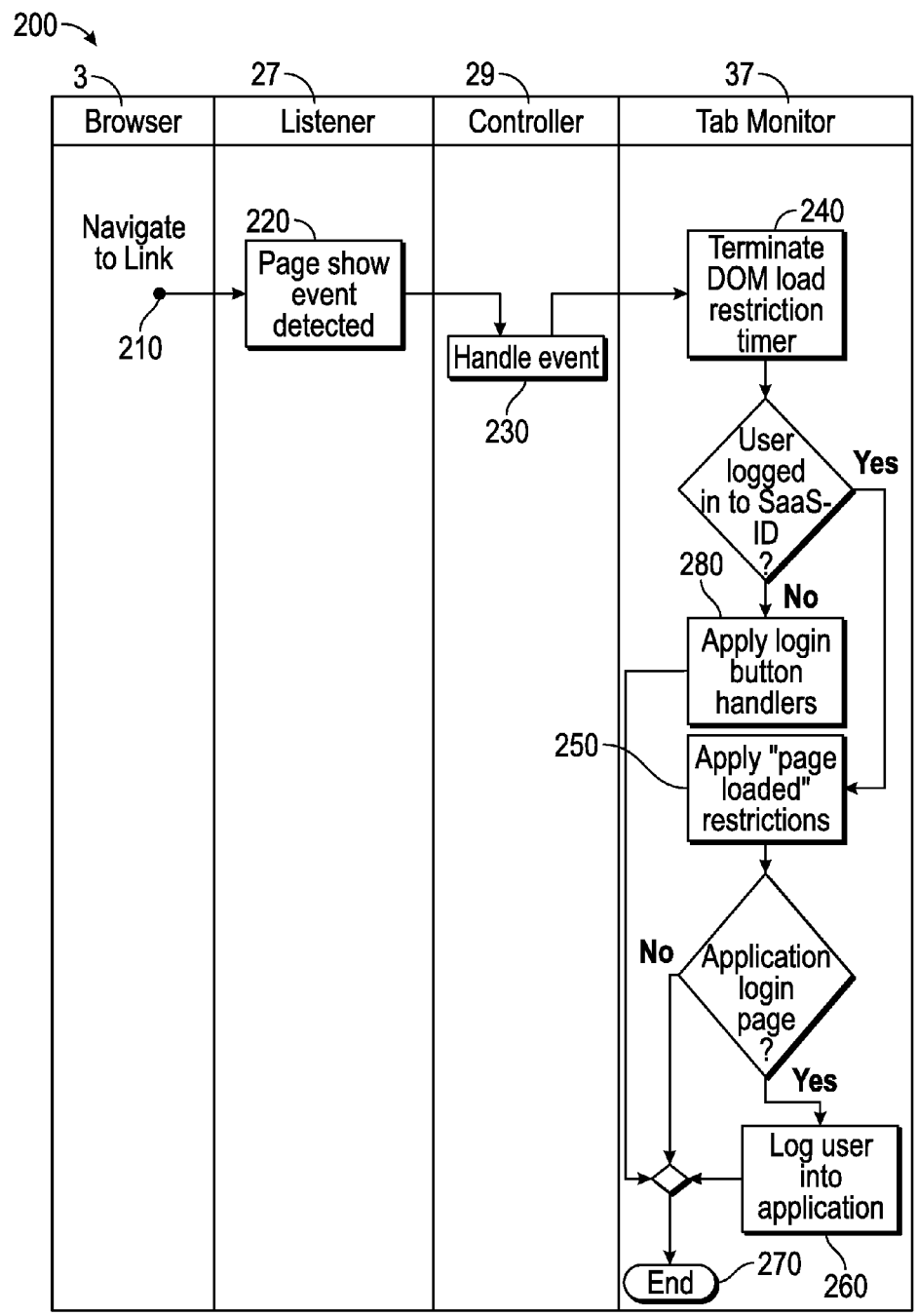
FIG. 4 shows a flow chart representing the process for detecting the loading of a new web page.

A second flowchart 200 illustrating the system steps implemented when a page is fully loaded into the browser 3 is shown in FIG. 4. When a user navigates to a web page in a tab of the browser 3 (Step 210), the listener module 27 detects that a page has loaded and a pageshow event is triggered (Step 220). The controller module 29 transfers the pageshow event (Step 230) to the tab monitor module 37 which terminates the restriction timer (240) applying the "DOM Load" rules. The tab monitor module 37 then checks if the user is logged into the extension 7.

If the user is logged in, the tab monitor module 37 applies the pageLoad rules (Step 250) accessed form the restriction map 41. The tab monitor module 37 then checks to determine if the web page requires a login and, if so, automatically inputs the user login details (Step 260). If the tab monitor module 37 determines that the user is not logged into the extension 7, it will attach an event handler to the login button to allow the login event to be captured by the extension 7 and handled accordingly. The process then ends (Step 270).

If the user is not logged in, the tab monitor module 37 applies login handlers (Step 280) and the process then ends (Step 270).

DOM Load Rules

Figure 5:
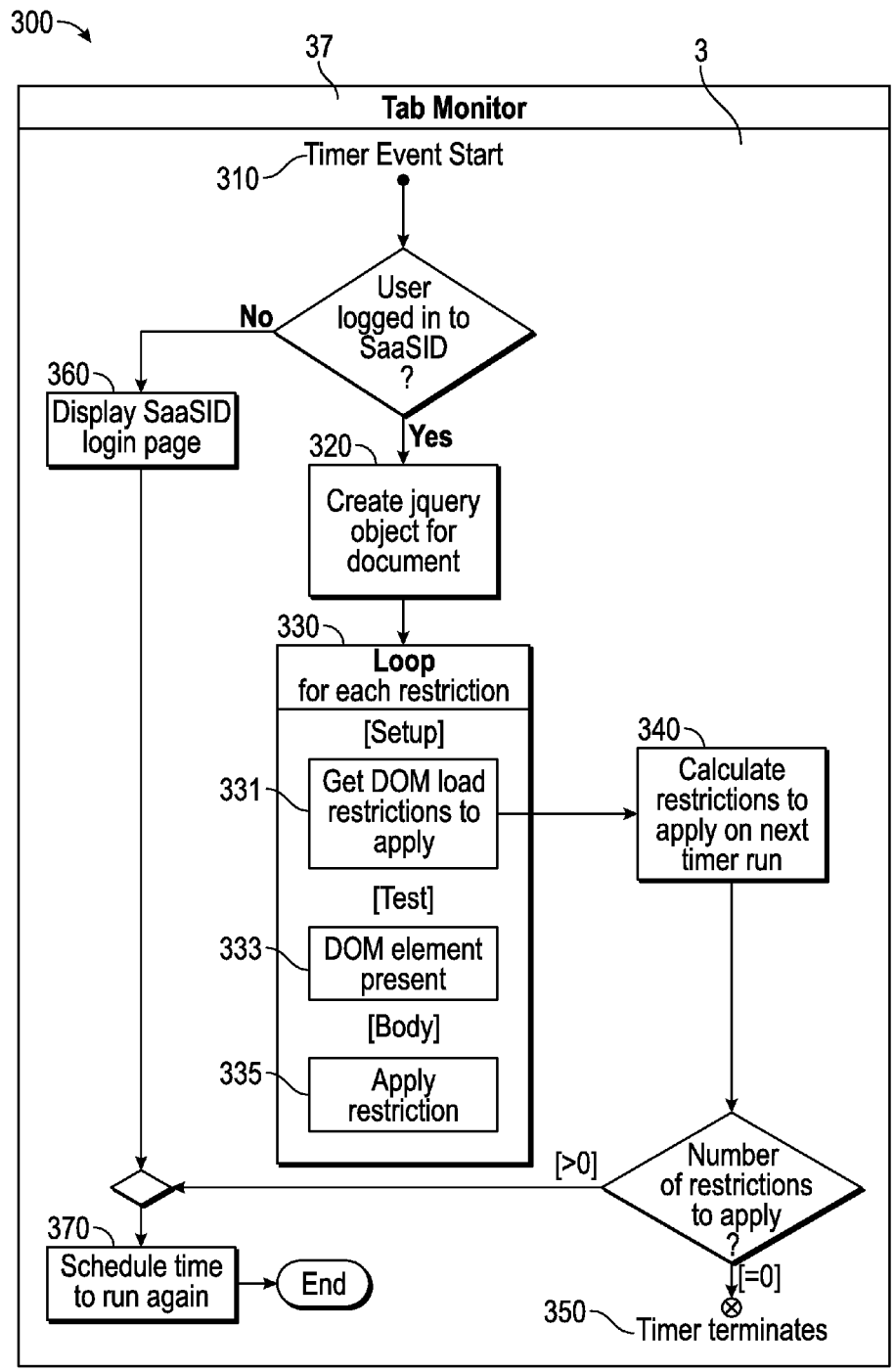
FIG. 5 shows a flow chart representing the process for restricting the rendering of elements of a web page.
Figure 6:
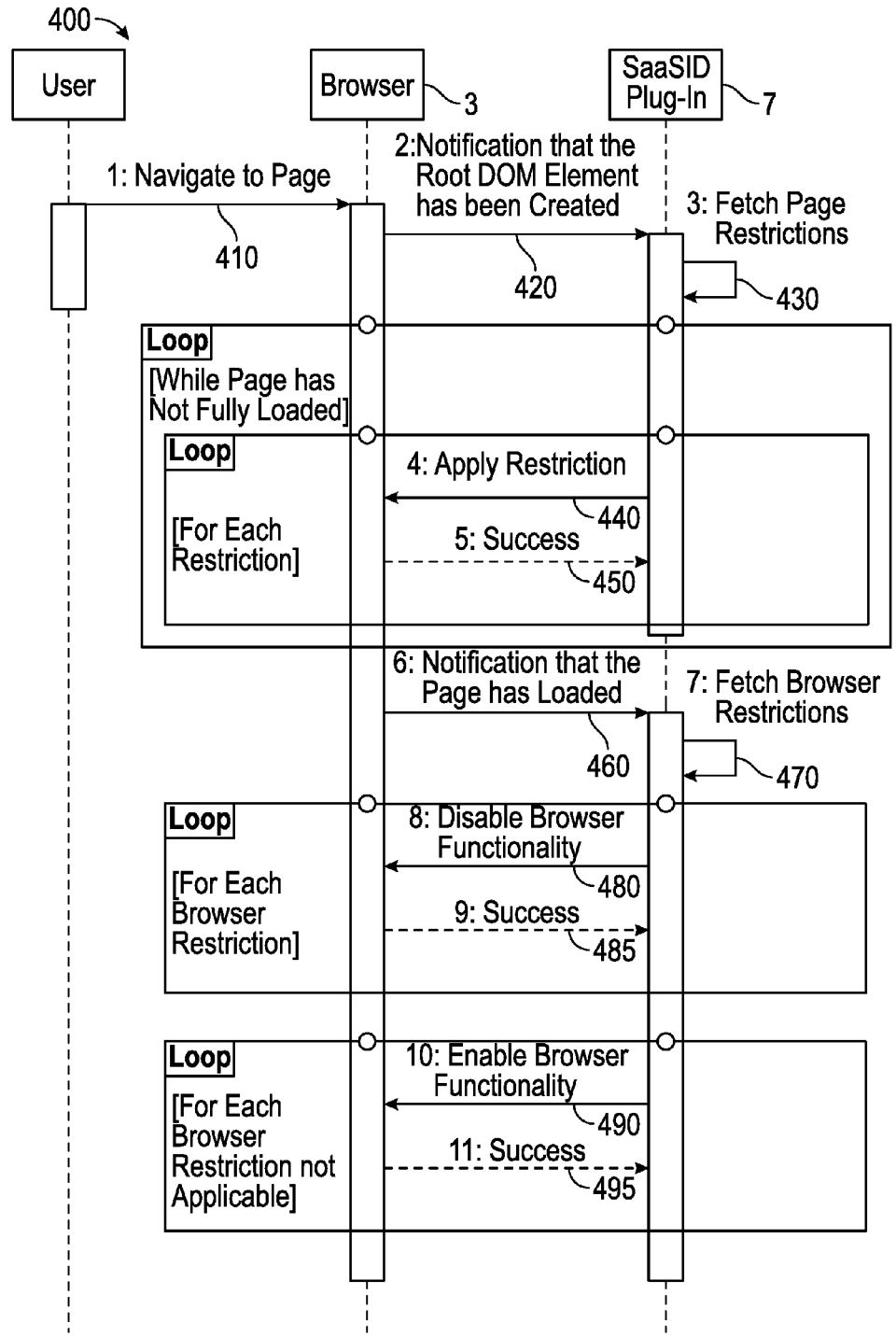
FIG. 6 shows a flow chart providing an overview of the process for restricting browser functionality and for modifying page content.

As outlined above, the tab monitor module 37 can initiate a restriction timer which is cycled every 100 ms to ensure that the page is rendered to the user for the first time incorporating one or more modified DOMs with the key rules applied. A third flowchart 300 showing this function of the tab monitor module 37 is shown in FIG. 5.

The restriction timer is initiated (Step 310), for example in response to detecting a page change. The tab monitor module 37 then checks if the user is logged into the extension 7. If the user has logged into the extension 7, the tab monitor module 37 creates a query object for the document (Step 320) and applies the "DOM Load" rules (Step 330) accessed from the restriction map 41.

More particularly, the application of the "DOM Load" rules (Step 330) comprises fetching the "DOM Load" rules to be applied (Sub-routine 331). The DOM element is then presented (Sub-routine 333) and a first rule applied (Sub-routine 335). This process is repeated in a loop for each rule to be applied to the element. Moreover, the process is repeated for each element to be rendered.

On a first run, the "DOM Load" rules which are relevant for the current page are all available. Once a restriction has been successfully applied, it is removed from the available list of "DOM Load" rules and will not be attempted again. As the entire process is being run while the DOM is still loading, it is possible for the element to not yet have been loaded into the DOM. If this is the case, the element will be restricted on a subsequent run of the restriction timer (Step 340). If the number of rules to apply on the current page is zero, after removing already applied rules, the timer process will be terminated (Step 350).

If the User has yet to log into the extension 7, the tab monitor module 37 replaces the contents of the current tab with a login page for the cloud application manager 9 (Step 360). The restriction timer can then be run again.

The restriction timer is then scheduled to be run again (Step 370). This procedure will be repeated until the original page has fully loaded in the background, to ensure the actual page which was requested does not overwrite the contents of the login page.

DOM Change Detected

When a "DOM Change" event notification is received, or a custom trigger event is detected, all "DOM Change" rules are applied to the current DOM by the tab monitor module 37 if the user is logged into the extension 7.

Web Page Restriction Sequence

The extension 7 can modify the appearance and/or functionality of a web page rendered via the browser 3 which is identified as being restricted for the user. The operation of the extension 7 will now be described with reference to a fourth flowchart 400 shown in FIG. 6.

The user navigates to a restricted page in the browser 3 (Step 410). The browser 3 notifies the extension 7 that a new root DOM element has been inserted into the page, via the relevant browser event listener (Step 420). The extension 7 fetches the page rules for the current URL, if any, from the restriction map 41 (Step 430).

The following two steps are carried out for each page restriction, until the extension 7 is notified that the web page has fully loaded. The extension 7 attempts to apply each rule contained in the restriction map 41 to the web page (Step 440). The rules are applied by finding DOM elements via a selector, which identifies individual or group DOM elements over which the rule will apply. The selector can retrieve DOM elements via any of the valid DOM attributes, such as its stylesheet class, element ID or DOM type. As outlined above, the rules contained in the rule set include hide, remove, removeParent, disable, blank, unwrap and screenshot. One or more of the rules can be applied. If the element has been found by the selector, the extension 7 is notified that the element is valid and that the restriction has been applied (Step 450).

The procedure for applying each rule in the restriction map 41 (consisting of Step 440 and Step 450) occurs in a loop until the page has loaded, as the document can render in sections over a period of time. By starting to apply the rules as soon as the page starts to render, it can remove any element of flickering, where restricted elements appear on the page, for them to be subsequently removed by the extension 7. Where the browser API allows it, this can be further enhanced by hiding the rendering of the page until the entire modified DOM is available, by applying a custom stylesheet. Once the page is fully loaded, the browser 3 notifies the extension 7 via the "DOM Content Loaded" event listener (Step 460).

The extension 7 then fetches all valid browser rules for the current page (Step 470) from the restriction map 41. The following two steps are carried out for each browser restriction applicable. The browser functionality is disabled in accordance with the browser rules (Step 480). The browser rules include print, save, view source and copy, as outlined above. The browser 3 notifies the extension 7 when an element has been successfully disabled (Step 485).

To ensure browser functionality is available on web sites where it has not been restricted, any browser functionality that has not been disabled within this process is forcefully enabled (Step 490). This is important when a user has swapped tabs, from a restricted site to an unrestricted one. The process for enabling browser functionality is the reverse of the process for disabling browser functionality. The browser 3 notifies the extension 7 when an element has been successfully enabled (Step 495).

The extension 7 can thereby control the rendering and/or functionality of a restricted web page. The rendering of the web page can be controlled by the extension 7, for example to inhibit the display of information on the web page and/or one or more functions provided within the web page. In parallel, the extension can control the browser 3 to inhibit browser functionality, such as copy and print functions. The extension 7 utilises a restriction map 41 which defines the rules applicable to a particular web page (or DOM). The restriction map 41 can be customised for each user or each group of users, for example by a system administrator. Equally, the list of web pages to be restricted can be customised for a particular user or group of users.

Context-Based Rules

It will be appreciated that different rules can be applied to a restricted web page based upon context information determined at the point of accessing the restricted web page. In particular, the one or more rules described herein can be applied based on context-specific information. For example, determining whether one or more of said rules is applicable can be based upon contextual information including: (i) physical geographical location of the computer; (ii) time of day; (iii) day of week; (iv) connection type; and (v) device type. This contextual information can be applied in addition to the contexts of user or group membership described elsewhere.

The physical geographical location is determined by querying an external IP geo-location service. The IP geo-location service identifies the physical location of the client computer 5. The time of day and day of week are determined by the user's locale and querying against an external web service to ensure the user has not altered their local system settings. The connection type is determined by comparing the IP address of the client computer 5 with IP address range information stored in a database defining those IP addresses relating to one or more of the following: (i) the internal network; (ii) remote access via IPsec VPN; and (iii) remote access via SSL VPN. If the IP address of the computer is not included within the ranges stored in the database then the connection type is determined as external.

Figure 7:
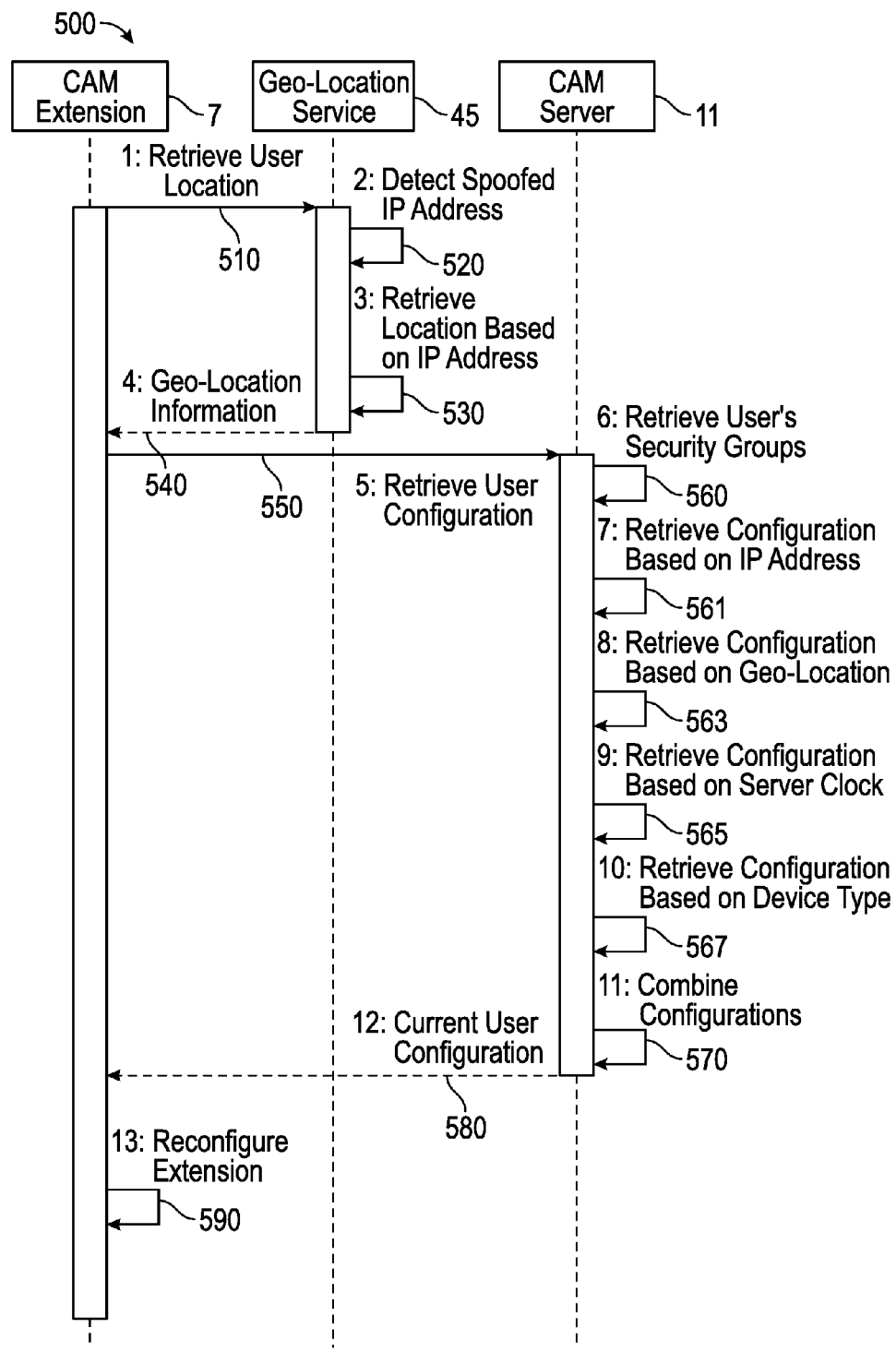
FIG. 7 shows a flow chart utilising geo-location service data for implementing context-based rules.

The extension 7 includes a context-checking component 43 which in the present embodiment is configured to communicate with an external Geo-location Service 45 to determine the location of the client computer 5. The location information is supplied to the cloud application manager 9 with user-configuration data. The operation of the context-checking component 43 will now be described with reference to a fifth flowchart 500 shown in FIG. 7.

The context-checking component 43 submits a request to retrieve its current location from the Geo-location Service 45 (STEP 510). The Geo-location service 45 is a dedicated service implemented independently of the server 11 and checks whether the user is using a spoofed, or manipulated, IP address (STEP 520). The Geo-location service 45 can, for example, be provided by a third-party. The IP address is thereby validated and, based on the validated IP address, the geo-location of the user is calculated (STEP 530). The Geo-location information is serialised and returned to the context-checking component 43 (STEP 540). A request for the latest user configuration is sent to the server 11, sending the geo-location information as part of the request (STEP 550).

The user's security group membership is retrieved from the server 11 and context policies are configured on a per-security group basis (STEP 560). The user-specific application restrictions are then calculated based on the user's current:
1. IP address (STEP 561)—either calculated for specific IP addresses, or based upon configured subnet masks.
2. Geo-location (STEP 563)—calculated using the following geo-location data:
   a. City
   b. Region c. Country d. Latitude/longitude 3. Server clock (STEP 565)—calculated using the current server clock, which is used as a time reference which cannot be manipulated by the end user.

4. Device type (STEP 567)—calculated using the user agent of the current connected device.

The user restrictions are then combined to specify the current user configuration for the context-checking component 43 (STEP 570). The configuration is serialised and returned to the context-checking component 43 (STEP 580). The context-checking component 43 is reconfigured and the latest user configuration and restrictions applied to any application tabs/windows that are already opened within the user's device (STEP 590). The application of restrictions is carried out directly in the browser 7, against any web application, rather than the usual server-side implementation which affects a single web application.

The extension 7 is configured to implement the user configuration and/or restrictions directly within the browser 3. The restrictions can be applied against any web application operating in the browser 3. This approach differs from the prior art arrangements in which restrictions are typically implemented by the remote server 11 (i.e. server-side implementation) and affect a single web application.

Server-Side Autentication

The system 1 implements a method of authenticating a user to a web site (or web application) from the cloud application manager 9 operating on the remote server 11, rather than from the browser 3 operating on the client computer 5. In this method the remote server 11 authenticates to the web site on behalf of the user and passes cookies to the cookie store in the local browser 3. This technique, referred to herein as server-side authentication, is implemented by the extension 7 operating in conjunction with the cloud application manager 9. To further enhance security, the verification credentials are not sent to the client computer 5 in the present embodiment.

Figure 8:
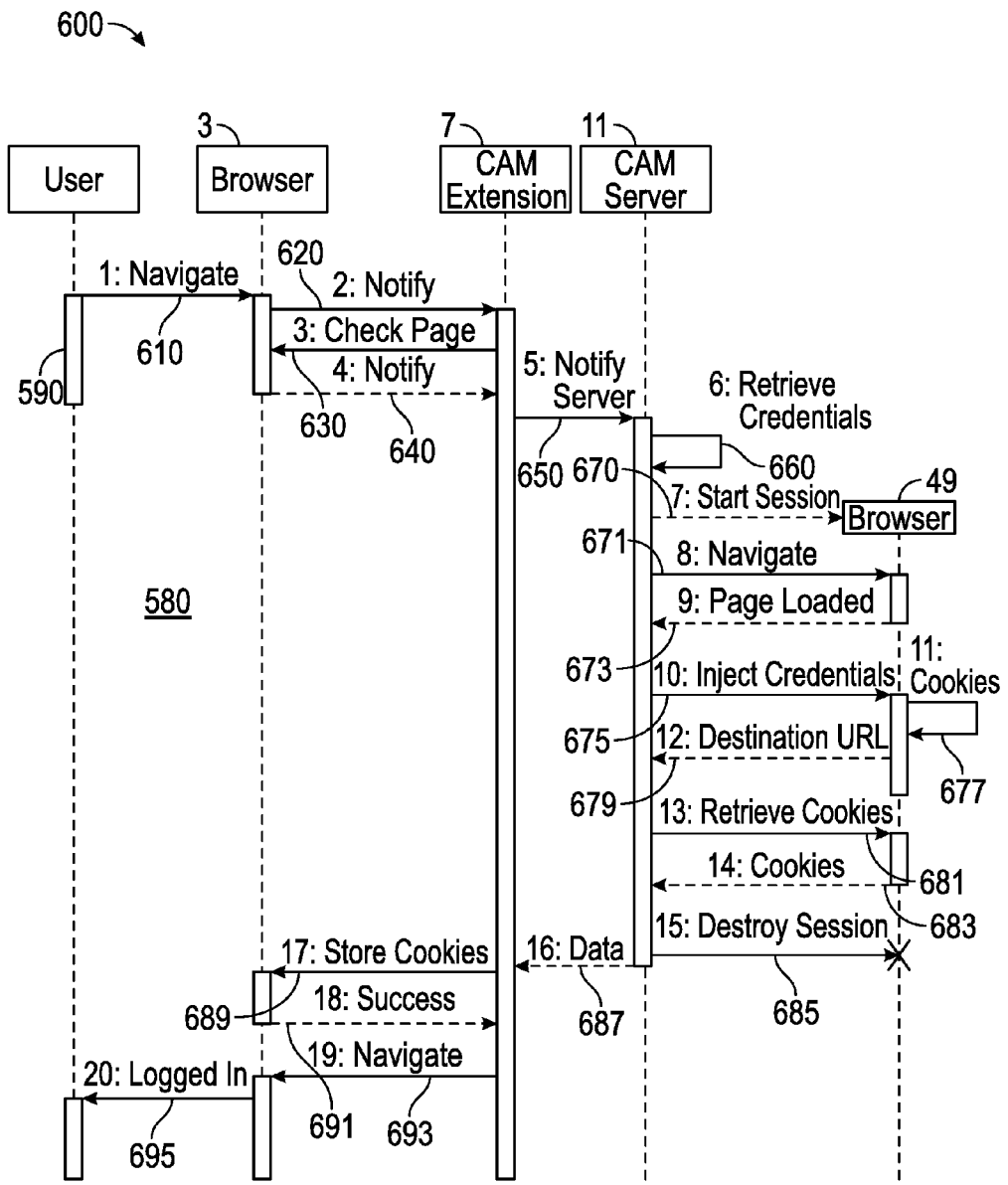
FIG. 8 shows a flow chart for implementing server-side authentication.

The operation of the server-side authentication will now be described with reference to a sixth flowchart 600 shown in FIG. 8.

A user navigates to a web-application which requires authentication (STEP 610). The browser 3 notifies the extension 7 that the application page has loaded (STEP 620); and the extension 7 inspects the page to determine whether login fields are present on the current page (STEP 630). Any login fields are detected for the specific URL (STEP 640). A request is sent by the extension 7 to the cloud application manager 9, requesting authentication to the application on the user's specific URL (STEP 650). The cloud application manager 9 retrieves the user's credentials for the specified application (STEP 660).

A new headless-browser session is started, with an empty cookie store (STEP 670). The cloud application manager 9 navigates the headless browser 49 to the user's URL (STEP 671); and the headless browser notifies the server 11 when the page is fully loaded (STEP 673). The cloud application manager 9 injects the user's credentials into the application's login form and submits the login form (STEP 675). The web application responds with cookies which represent the user's current session (STEP 677). The headless browser 49 notifies the cloud application manager 9 that the user is logged in, with a specific destination URL (STEP 679). The cloud application manager 9 requests the user's application cookies (STEP 681); and the headless browser 49 responds with the requested cookies (STEP 683). The browser session is then destroyed (STEP 685) to ensure that the cookies cannot be retrieved by another user.

The cloud application manager 9 serialises the cookies into a data format which can be sent to the extension 7 and sends them, along with the destination URL (STEP 687). The extension 7 stores the cookies in the cookie store of the browser 3 (STEP 689). The browser responds with a success message (STEP 691). The extension 7 notifies the browser to navigate to the destination URL (STEP 693). The user is presented with the application in a logged-in state (STEP 695).

Audit Trail

The system 1 can be configured to capture relevant information from within a restricted web page and send the captured information to the cloud application manager 9 on the remote server 11 as part of an audit event, for example to supplement details such as the URL of the web page. The information can, for example, be captured in response to one or more of the following events: DOM Load; DOM Change; Page Load; Page Change; and a custom trigger. This capability enriches the audit trail to support analysis of user interaction with web sites or forensics investigations.

The information can be captured from one or more pre-defined DOM elements from the web application's page DOM, loaded on the browser 7, including both background DOM elements (for example a DIV or SPAN element), or input DOM elements which can receive input by the user (for example a text input for a file name or email address). The captured information can, for example, comprise one or more of the following: file name(s); email addresses; exported data; report generating parameters. For example, in the case of a user action being the attachment of a file to a web mail message, relevant information includes the name of the file and the email addresses of the recipients of the email message. In the case of a user exporting data from a web application, relevant information may include a copy of the data exported and/or the name of the report run to initiate the export.

Traditional web monitoring systems that reside on the network, typically at the Internet gateway, are unable to capture all user interaction with Single Page Interface applications. Within a Single Page Interface application all necessary code (HTML, JavaScript, and CSS) is retrieved with a single page load. Updates to the page (as the user interacts with it) may or may not involve further interaction with a server. If there is no interaction with a server, a traditional monitoring system will not capture user activity within the application.

At least in certain embodiments, the system 1 enables an audit trail to be generated, even for interaction with Single Page Interface applications. The extension 7 is configured to listen for one or more DOM events and to store related data when each said DOM event is detected. The DOM events can be pre-defined, for example by a system administrator. The DOM events can be associated with a user action (for example the DOM event can include identifying when an on-screen button is clicked by the user); and/or can be related to activity within the browser 3 (for example, the DOM event can be triggered when a web page has been loaded or is modified). When a DOM event is detected, it is added to specific, configurable elements within the page's HTML DOM. A list of DOM events is provided in the W3C specification for HTML DOM events (see http://www3.org/TR/DOM-Level-3-Events/). When these DOM events are subsequently triggered by the user, for example by events such as a mouse click or a keyboard input, the extension queries the page's HTML DOM for data contained within other configurable elements. The data contained within these elements are held in either memory or persistent storage on the device and subsequently serialised and sent to the server 11 for auditing.

Figure 9:
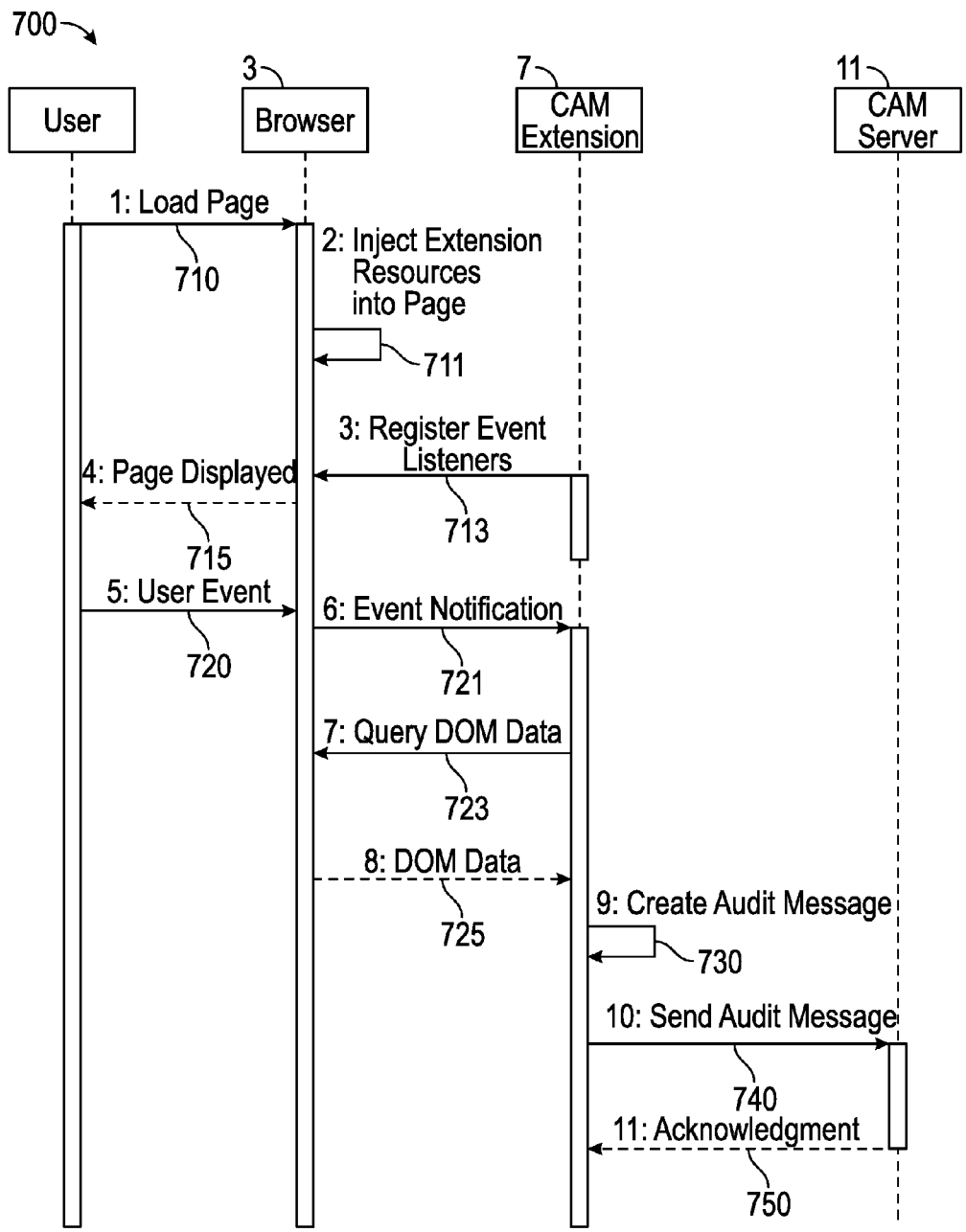
FIG. 9 shows a flow chart for generating an audit trail for storage on a server.

The operation of the audit trail techniques will now be described with reference to a seventh flowchart 700 shown in FIG. 9.

A user navigates to a page in the browser 3 and the page is loaded (STEP 710). The browser 3 injects the extension 7 resources into a page-specific sandbox (STEP 711). The extension 7 registers specific, configurable DOM and JavaScript event listeners with the browser's DOM and JavaScript engine (STEP 713). These listener configurations are specified on a per-security group level and are subsequently applied to a user based upon their security group membership. The application's page is displayed to the user (STEP 715).

Optionally, a user's interaction with the page, or a background AJAX event, may trigger a modification to the DOM (STEP 720). The DOM is modified (STEP 721); and the extension 7 is notified of a DOM modification event (STEP 723). The extension 7 applies and registers any additional DOM and JavaScript event listeners, based upon the latest DOM (STEP 725).

A User Event, or background AJAX call, triggers one of the registered event listeners. The extension 7 is notified of the event by the browser 3; and the extension 7 queries the current DOM data, based upon the audit event configuration. The relevant DOM data is returned to the extension 7. Optionally, the extension 7 can take a screenshot of the current user's device viewport. An audit message is constructed and serialised (STEP 730). The audit message is sent to the server 11 (STEP 740); and the server 11 acknowledges receipt of the audit message (STEP 750).

Multiple Credentials

A single user can have multiple credentials or accounts associated with their identity on the cloud application manager 9 for a particular web site or web application. This reflects the fact that individuals have multiple accounts on specific web sites, for example for personal and professional use. The credentials are stored on the remote server 11.

On accessing the login page of a web site for which multiple credentials are stored, the user is presented with a drop down list of accounts. The user can select the account to be used to access the web site for that session.

Figure 10:
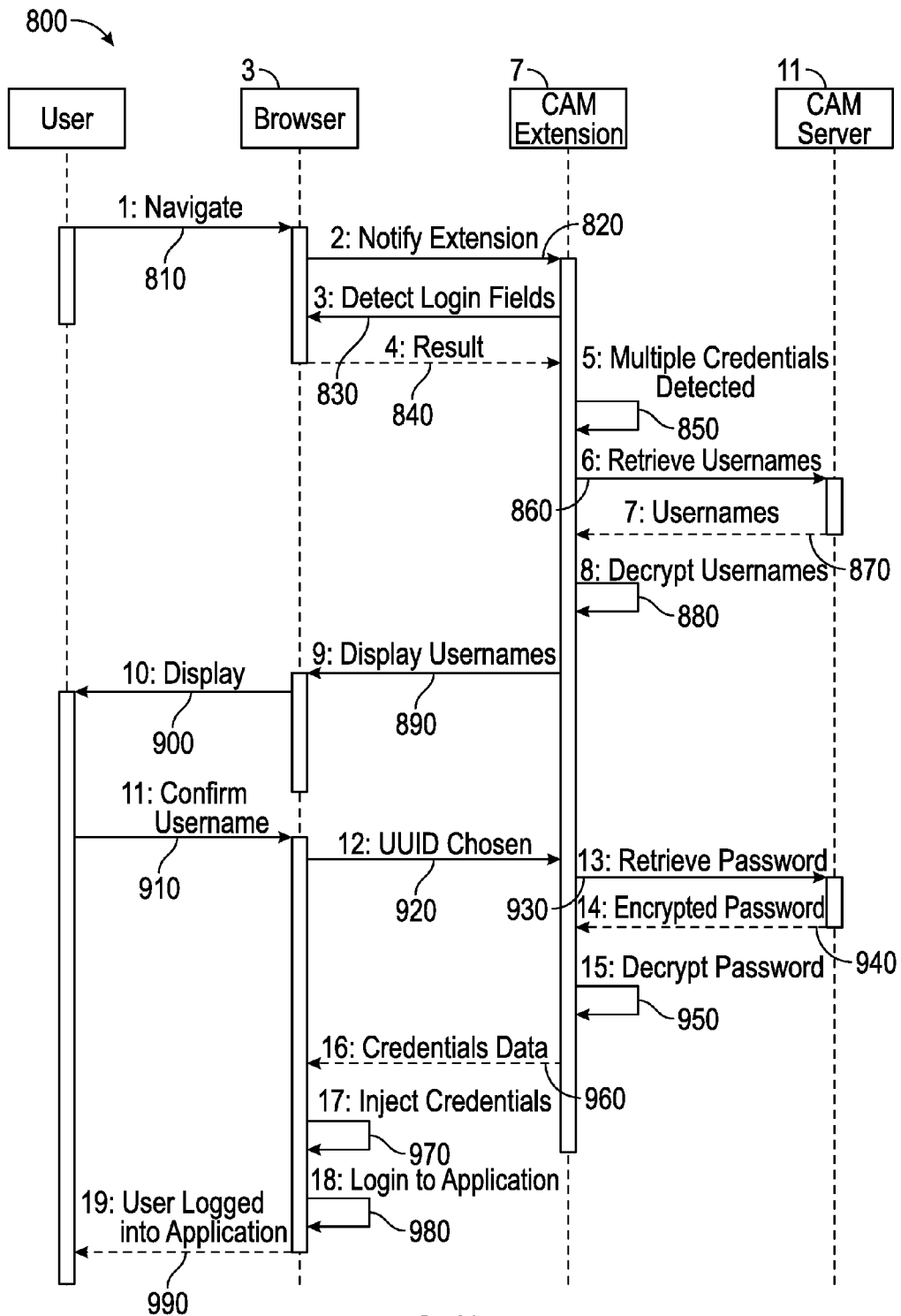
FIG. 10 shows a flow chart illustrating the implementation of multiple credentials for a user.

The implementation of multiple user credentials will now be described with reference to an eighth flowchart 800 shown in FIG. 10.

The user navigates to a managed web application (STEP 810); and the browser notifies the extension 7 of the page load (STEP 820). The extension 7 interrogates the DOM to detect the application's login form fields (STEP 830). If login fields are detected, related information is returned to the extension 7 (STEP 840). The extension 7 checks the current user's configuration to determine whether there are multiple credentials available for the current web application (STEP 850).

The credential UUIDs (Universally Unique Identification) for the current application are sent to the remote server 11, to retrieve the usernames for the credential references held in the extension 7 configuration (STEP 860). A serialised map of UUID to encrypted usernames is returned from the remote server 11 (STEP 870). The usernames are decrypted by the extension 7 (STEP 880); and the available usernames are rendered into the application page's DOM (STEP 890). The application login page is displayed to the user, with a dialog box displaying a choice of the available credentials (STEP 900).

The user confirms the credential they wish to use to login to the web application (STEP 910). The browser 3 notifies the extension 7 of the credential UUID chosen by the user (STEP 920). The extension 7 requests the password for the specified UUID from the remote server 11 (STEP 930). The encrypted password for the given credential is returned to the extension 7 (STEP 940); and the password is decrypted (STEP 950).

The username and password are returned to the extension resources which are running within the context of the application DOM (STEP 960). The username and password are injected into the login form fields (STEP 970). The login form is submitted and the user logged into the web application (STEP 980); and the user presented with the web application in a logged-in state (STEP 990).

Content Filtering

The extension 7 can be configured to inhibit or prevent access to certain web page content. The extension 7 can identify content within a web page and apply one or more rules to modify an element of the web page or prevent the page from being rendered on the computer completely and optionally replace it with a pre-defined page stating that content has been blocked.

The extension 7 can compare the content of a web page to a look-up table stored in a database of undesirable, inappropriate or offensive keywords and phrases. The look-up table can be defined for a particular user or group of users. Either specific elements of a web page containing content that exists in the look-up table can be blocked or obfuscated; or the entire page can be prevented from being rendered. The look-up table could optionally also include URLs of web pages known to contain inappropriate content could be included within the look-up table.

Figure 11:
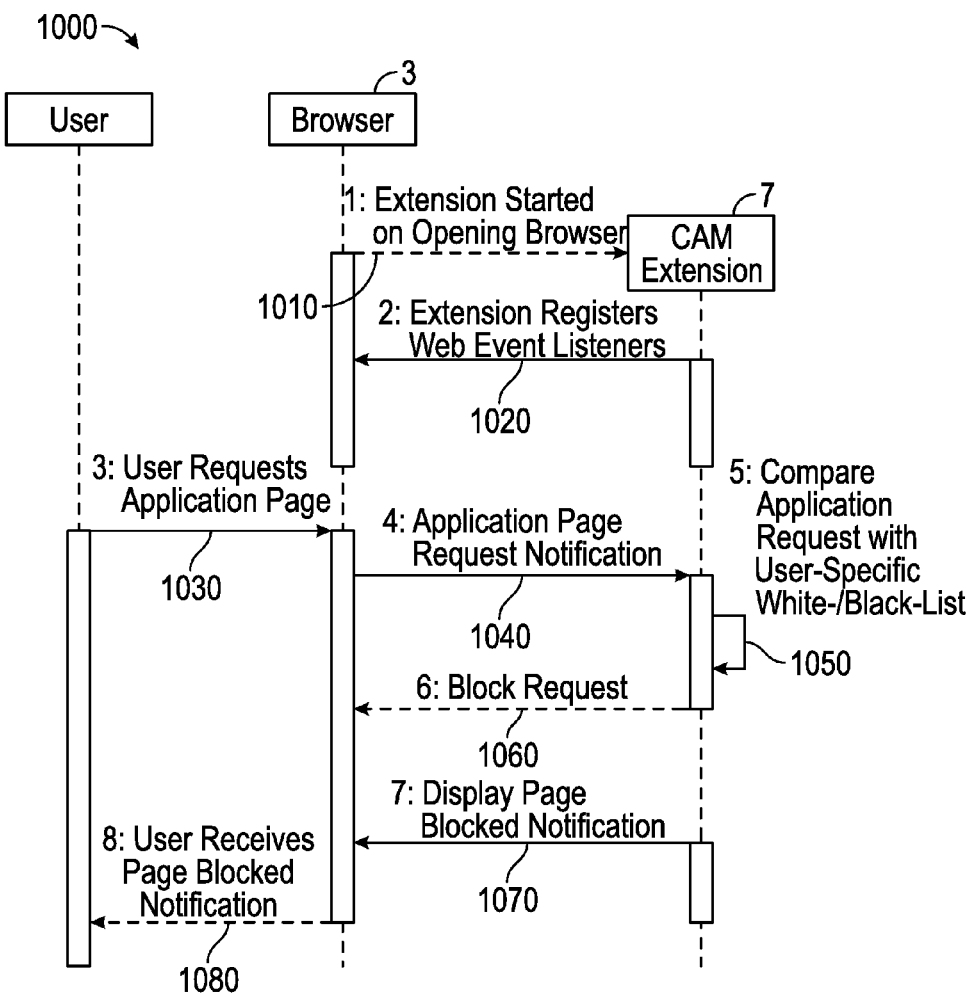
FIG. 11 shows a flow chart for the implementation of content filtering.

The implementation of the content filtering techniques will now be described with reference to a ninth flowchart 1000 shown in FIG. 11.

When the browser opens, the extension 7 is initialised (STEP 1010). The extension 7 registers event listeners for browser web request and response events (STEP 1020). A user requests a specific web application page (STEP 1030). It should be noted that this may be a single-page interface and no communication is required with the end-user web application to move to the "page", which is simply a newly rendered view on a different URL. The browser notifies the extension 7 that a web application URL change event has occurred (STEP 1040). The extension 7 validates the requested URL/data request against a white- and/or black-list (STEP 1050). The white/black list is a user-configurable set of data (typically configured by a system administrator) which can be referenced to determine whether a user request is allowed or denied. For example, a white list can consist of a list of allowed URLs; and a black list can consist of a list of blocked or disallowed URLs. The extension 7 notifies the browser 3 to cancel the requested event (STEP 1060). The extension 7 notifies the browser 3 to display a blocked notification (STEP 1070); and the user receives a page blocked notification (STEP 1080).

Preventing Downloads

The extension 7 can prevent execution of any code within a web page to protect the computer from malicious programs embedded within a web page. When URLs belonging to a managed web-application are accessed, the HTTP response headers "Content-type" and "Content-Disposition" are inspected. If the content type is restricted for the configured application, the response is cancelled and the user is notified that the content is blocked. The configuration is based upon an application configuration defined for a particular user group, which is subsequently applied to users allocated to that group.

Figure 12:
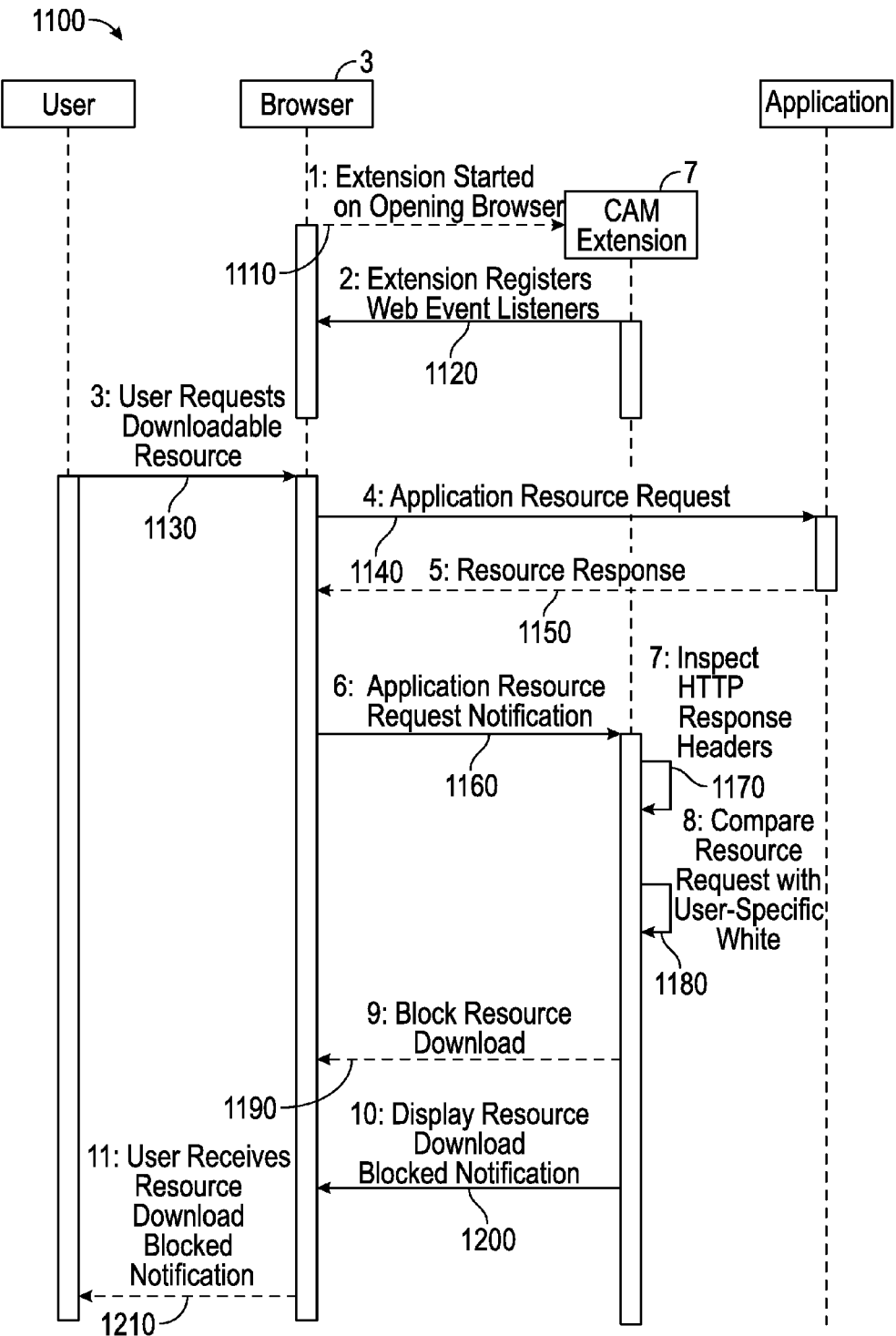
FIG. 12 shows a schematic representation of the implementation of browser extensions.

The implementation of the download prevention techniques will now be described with reference to a tenth flowchart 1100 shown in FIG. 12.

The extension 7 is initialised when the browser 3 opens (STEP 1110). The extension 7 registers event listeners for browser web request and response events (STEP 1120). A user requests a downloadable resource from the web application (STEP 1130). The browser 3 initiates the request with the end-user web application (STEP 1140). The browser 3 starts receiving the resource, along with the associated HTTP response headers (STEP 1150). The browser 3 notifies the extension 7 that a resource is being downloaded (STEP 1160). The extension 7 inspects the HTTP response headers associated with the resource (STEP 1170); and validates the resource request against the user-specific white- and/or black-list, utilising the "Content-Type" and "Content-Disposition" HTTP response headers, along with other response header data delivered with the response (STEP 1180). The extension 7 notifies the browser 3 to cancel the resource download (STEP 1190); and to display a resource download blocked notification (STEP 1200). The User receives a notification to advise that the resource download has been blocked (STEP 1210).

Support for Browser Extensions on iOS Devices

Figure 13:
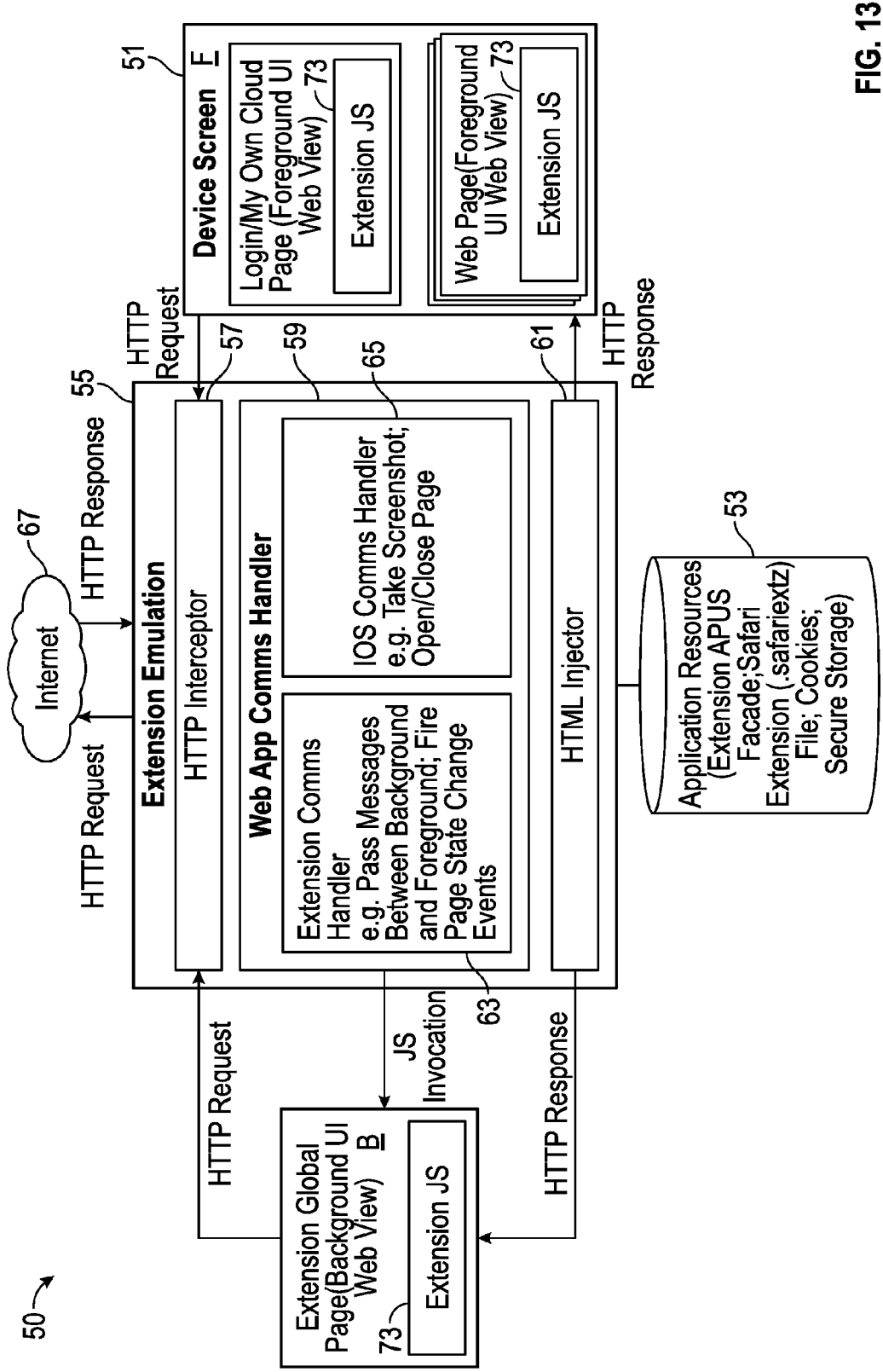
FIG. 13 shows a system schematic of an extension emulator for iOS systems.
Figure 14:
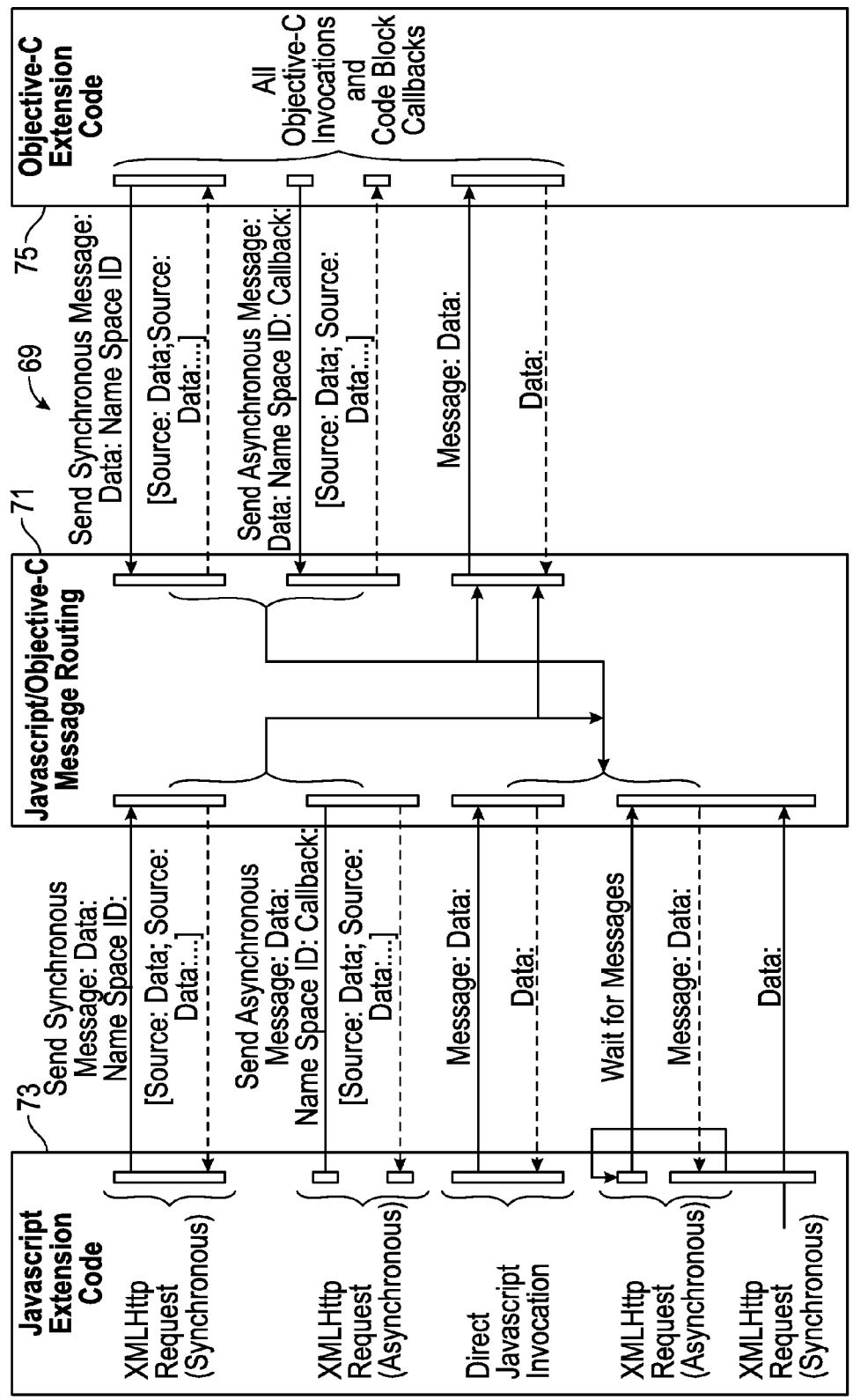
FIG. 14 shows a web application communication handler for the extension emulator shown in FIG. 13.

In a still further aspect, the invention includes a method of supporting the extension 7 for Safari on an Apple iOS device, as illustrated in the system schematic shown in FIGS. 13 and 14. The extension 7 is supported on the iOS device via an installable application ("app") 50 (for example downloaded from the iTunes store) configured to access a resource file store 53. The application 50 comprises a web browser (a web view 51 is illustrated in FIG. 13); a Safari extension management and parsing module (not shown); and a Safari extension emulator 55. The web browser component provides functionality similar to existing browsers, and in addition renders certain extension features outside of the browser window to provide a more native iOS experience. In particular, the extension toolbar menu and menu items are rendered as iOS tables with selectable rows; and certain web pages (e.g. login, managed cloud applications, extension settings) specified by the extension 7 are displayed as modal views with animated transitions.

The Safari extension management and parsing module implements the eXtensible ARchiver (XAR) with digital signature specification (see, for example, http://code.google.com/p/xar/wiki/xarformat), The Safari extension management and parsing module can read a Safari extension file packaged for a normal Safari desktop browser. The management and parsing module checks for and downloads version updates, validates the digital signature of the extension file and parses its contents with checksum validation. The digital signature validation is restricted to only allow certificate chains that start with certificates defined by the application and end with the Apple Root CA certificate. It maintains a cache of the extension file to decrease start-up time when new extension versions are not available.

The Safari extension emulator 55 comprises a Safari extension API JavaScript (JS) facade that runs in web pages and objective-c extension invocation handling code. The extension emulator 55 runs in a single extension global web page in the background (B) and also in each browser web page that is visible in the foreground (F) on a device display.

The extension emulator 55 comprises an HTTP interceptor 57, a web application communications handler 59 and an HTML injector 61. The web application communications handler 59 comprises an extensions communications handler 63 (for example, to pass messages between the background (B) and the foreground (F); and fire page state change events); and an iOS communications handler 65 (for example to take screenshots; and open/close pages). The functional parts of the emulator 55 and their interactions will now be described with reference to FIG. 13.

1. The browser generates an HTTP page request.
2. The HTTP interceptor 57 intercepts the HTTP page request and passes it to the internet (denoted by the reference numeral 67).
3. The HTML injector 61 injects into a HEAD element of the HTTP page response a link to the non-JS extension resources; and a link to a pre-built emulation JS resource that combines the extension JS resources and the extension API JS facade into an anonymous JS namespace (so as to not interfere with, and to not be accessible by, any other JS used by the web page).
4. The extension emulator 55 intercepts HTTP requests for the non-JS extension resources and directs them to the extension resource files (in the resource file store 53) loaded by the Safari extension management and parsing module.
5. The extension emulator 55 intercepts the HTTP request for the pre-built emulation JS resource and directs it to the corresponding data.
6. The extension JS API facade maintains local resources (within the page) necessary for emulation and communicates with the objective-c extension invocation handling code via JSON-RPC over HTTP requests.
7. The extension emulator 55 intercepts the JSON-RPC over HTTP requests and directs them to the objective-c extension invocation handling code.
8. The objective-c extension invocation handling code performs the necessary actions (e.g. passes a message to the extension global web page JS via a direct JS method invocation on the extension JS API facade).

The sequence of events to achieve emulation for the background extension global web page is similar to the above. However, the JS extension resources and the extension JS API facade are not combined into an anonymous JS namespace, but are injected as separate links to resources. Furthermore, the objective-c extension invocation handling code performs actions relevant to the background extension global web page (e.g. passes a message to the foreground extension JS code; opens a new browser page; captures a screenshot). Also, the messages are passed to the foreground extension JS code via a JSON-RPC over HTTP response, handled by a listener created by the extension JS API façade. This approach helps to ensure that messages cannot be intercepted by any other JS used by the web page.

In addition to these sequences, user interactions relevant to the extension emulator 55 (for example, opening/navigating/closing web pages; selecting extension toolbar menu items) result in events being raised in the extension JS API facade by communication between the objective-c code and extension JS API facade.

The application 50 implements the Safari extension secure storage API in a sandboxed and encrypted data store to provide a persistent data set which is maintained between terminations and re-starting of the application 50. The sandboxing and encryption ensure that this data is only accessible from the application 50. In addition, a flag set on the iOS device secure storage keychain ensures that the data is only accessible by the application 50 when it is in the device foreground.

The application 50 exposes management of the browser cookies to the background extension global web page JS, so that web sessions can be terminated and to support server-side authentication (as described herein).

In the present embodiment, the domain used by the extension JS API facade to request extension resources and to send JSON-RPC over HTTP requests is a long string of random characters and numbers, which is re-generated each time the application 50 is started. This ensures that JS code used by the web page is unable to access extension resources or communicate with the application 50 (the number of combinations is so high that the JS code wouldn't have enough time during the active life of the app to discover the domain string). Furthermore, most of the functionality exposed to the extension JS API facade from the objective-c extension invocation handling code is limited to invocation only from the background extension global web page, and therefore inaccessible from the foreground web pages.

The application 50 comprises a Web Application Communication Handler 69 which enables communication between the JavaScript extension and the objective-c extension. In particular, the Web Application Communication Handler 69 comprises a message routing module 71 for managing communication between a JavaScript extension code module 73 and an objective-c extension code module 75 (operating on iOS).

JavaScript/Objective-c Message Routing

The Web Application Communication Handler 69 enables communication between the extension code modules 73, 75 via JavaScript/objective-c message routing. The message routing implements bi-directional method invocation and synchronous/asynchronous method responses between JavaScript running within a UIWebView and objective-c within the application 50. The technique comprises:

- use of a JavaScript XMLHttpRequest object to make synchronous/asynchronous method invocations from the JavaScript extension code module 73;
- use of the JavaScript XMLHttpRequest object to register foreground extension JavaScript method invocation listeners;
- use of the objective-c UIWebView "string ByEvaluatingJavaScriptFromString" method to directly invoke background extension JavaScript methods; and
- use of the HTTP Interceptor to direct requests from the XMLHttpRequest object to the Web Application Communications Handler and to return responses.

In the event that a response comprises data, it is sent by an XMLHttpRequest. The message routing module 71 is able to establish a connection between this XMLHttpRequest and the response message required by the second message.

Communication Pseudo Code

Before communication can be performed, the JavaScript extension code module 73 and the objective-c extension code module 75 need to register their namespace with the Web Application Communication Handler 69 via the following (pseudo) code:

registerNamespace:"namespace (e.g. corn.saasid.iOSCommsHandler)"

This returns a unique namespace ID to be used in subsequent invocations. JavaScript methods and objective-c code blocks for handling messages are then registered with the Web App Comms Handler via the following (pseudo) code:

registerMessageHandler:handler name: "name of the message"
    namespaceID:"namespaceID"
    sourceWhiteList:["namespaceA","namespaceB"] (JavaScript only)
    useDirectJSInvocation:true/false The "sourceWhiteList" parameter enables a message handler to only accept messages from a list of source namespaces. This is important for providing specific functionality to particular parts of the extension emulation; for example so that the iOS Communications Handler 69 will only respond to messages that have been sent from the background extension JavaScript.

The "useDirectJSInvocation" parameter is for JavaScript to indicate whether or not it can receive messages with direct JavaScript invocation. Direct JavaScript invocation is only possible if the JavaScript is not within an anonymous namespace; in the case of the foreground extension JavaScript, which is within an anonymous namespace, the value is always false.

Messages can then be sent for synchronous responses via the following (pseudo) code:

responseData=sendSynchronousMessage:"name of message" data: data namespace: "namespace of message recipient(s)"

or asynchronously via the following (pseudo) code:

sendAsynchronousMessage:"name of message"data:data namespace: "namespace of recipient(s)" callback:callback Message Namespaces The use of namespaces allows a message to be sent to multiple recipients, e.g.:
- to all recipients: namespace:"*"
- to extension JavaScript in every foreground web page: namespace:"com.saasid.webpage.foreground."

Response Data Format

The synchronous response data and response data sent to the asynchronous callback has the following (pseudo) format:

[source: "namespaceA" data: dataA, source:"namespaceB"data:dataB], . . . .

The data can carry multiple responses if the message was sent to multiple recipients.

Web Application Communication Handler

This component handles the JavaScript/objective-c message routing.

Extension Communication Handler

This component encompasses the communication between the extension JavaScript on the background and foreground web pages. It also handles communication with the extension JavaScript originating from the applications objective-c; for example to inform of page events.

iOS Communication Handler

This component handles communication with the application's objective-c originating from the extension JavaScript; for example to capture screens shots or to open and close pages.

Figure 15:
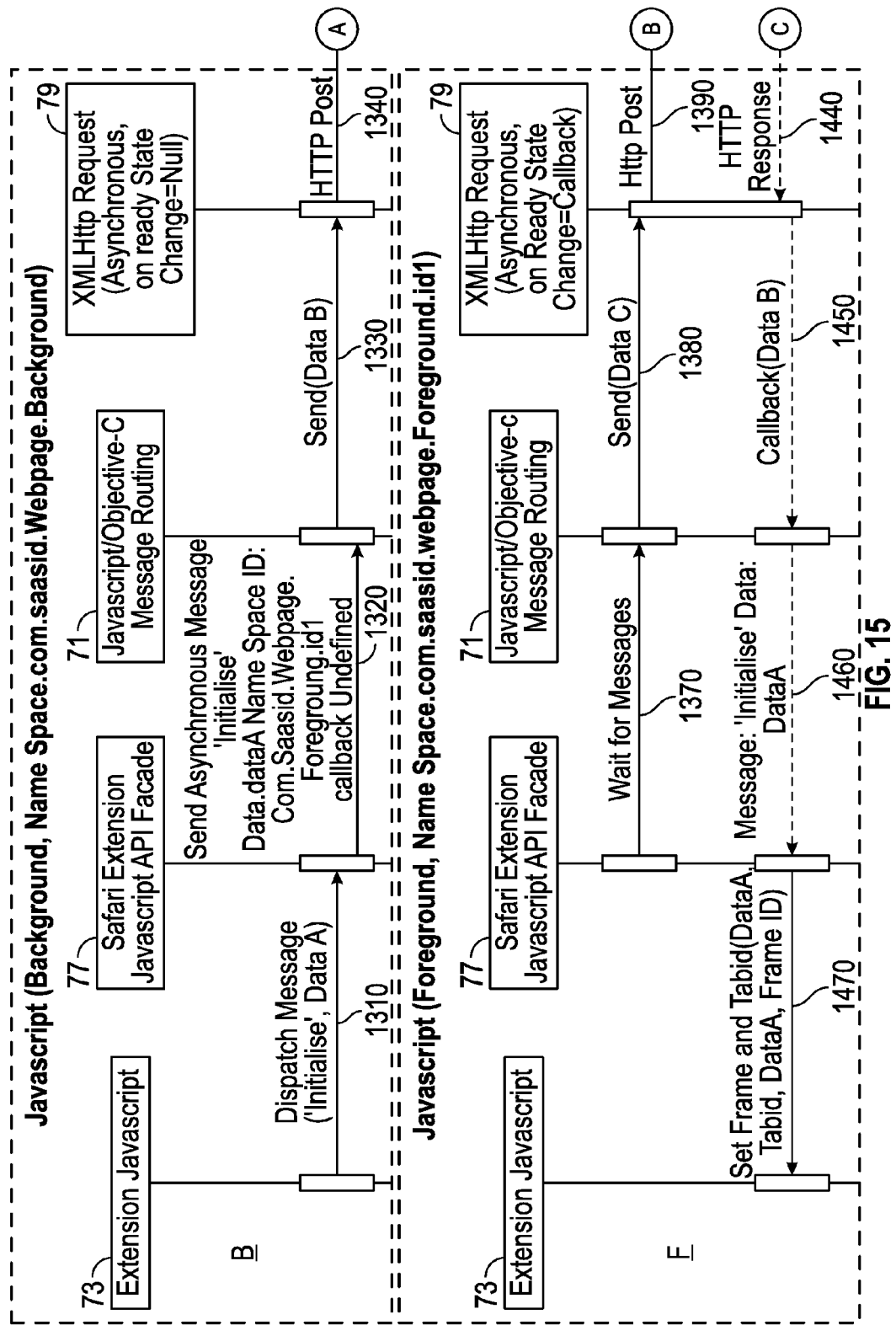
FIG. 15 shows a sequence diagram illustrating communication between the background and foreground of the extension according to an embodiment of the present invention.
Figure 15:
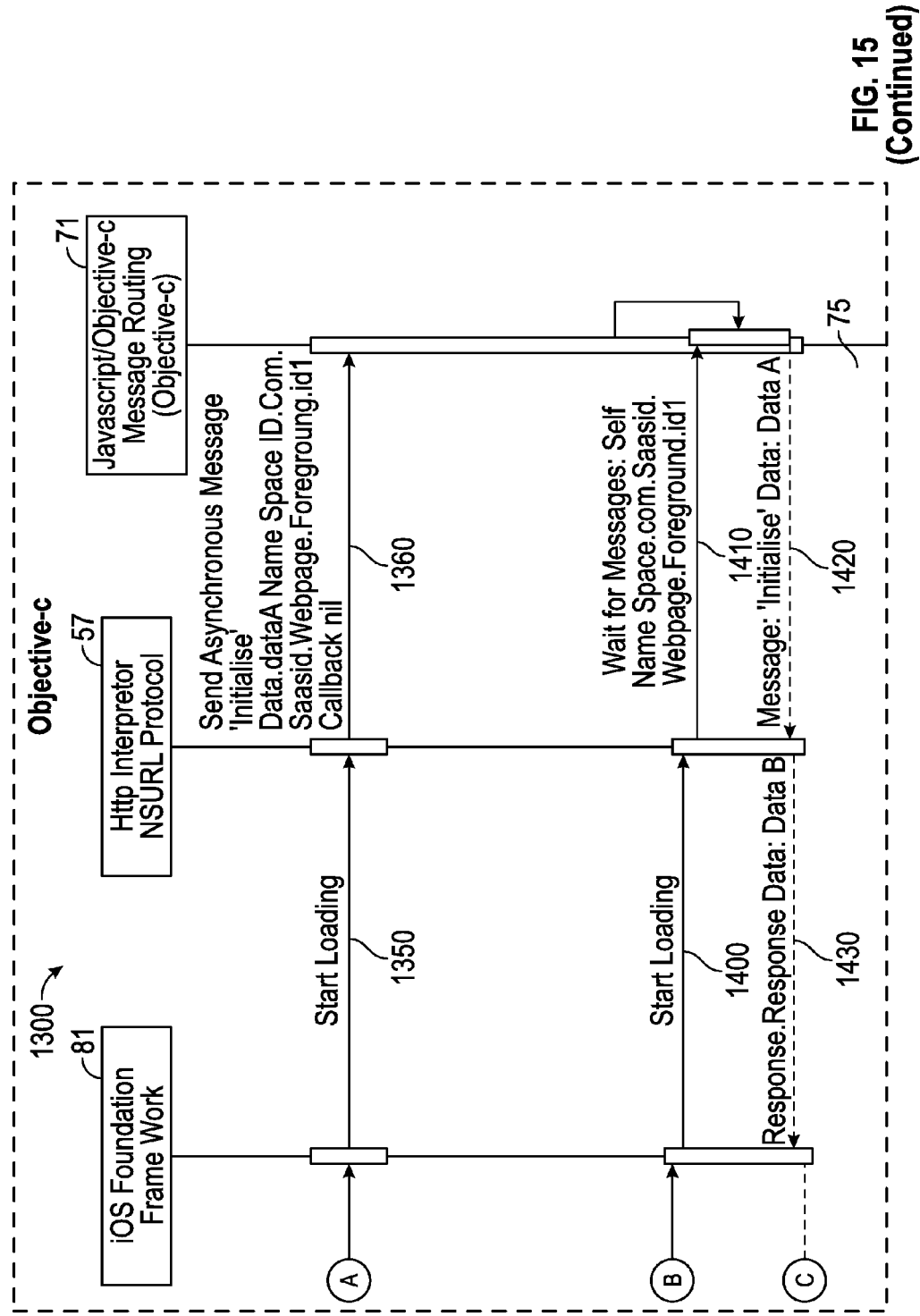

A sequence diagram 1300 shown in FIG. 15 depicts how the extension JavaScript in the extension global page (running in the background) sends initialisation data to the extension JavaScript in a web page (running in the foreground). Within the sequence diagram 1300 the heavily shaded objects are not proprietary to the Applicant and are available on any iOS device. The dashed lines within the sequence diagram 1300 represent responses.

The data used in the illustrated sequence is specific for sending initialisation data within the browser extension 7. It will be appreciated that other browser extension messages can follow this sequence, for example: "changeLoginStatus", "changeServerAvailabilityStatus", "retrieveCredentials". This sequence would be used on iOS devices by any browser extension that needs to send data from the JavaScript in the extension global page to the extension JavaScript in a web page.

The foreground extension JavaScript is within an anonymous namespace, and so it is only accessible from the application objective-c once it registers itself with the Web Application Communication Handler, as illustrated in the foreground (F) illustrated in FIG. 15 (these steps are shown in the bottom half of the sequence diagram, starting with "wait- ForMessages" and terminating at the JavaScript/objective-c Message Routing object within the objective-c).

The data in the sequence diagram 1300 comprises:

dataA—the data to be sent with the initialisation message (to be used in an invocation of "setFrameAndTabId" on the foreground extension JavaScript), including:
  tabId;
  frameId.

dataB—a combination of dataA and additional data required by the objective-c message routing, including:
  a unique message identifier;
  the message routing name ("sendAsynchronousMessage");
  the background namespace identifier, to identify from where the message has originated;
  a flag to indicate that no response is expected because the "sendAsynchronousMessage" message was used with an undefined callback;
  a time-stamp for auditing purposes.

dataC—data required by the objective-c message routing to register a message listener:
  a unique message identifier;
  the message routing name ("waitForMessages");
  the foreground namespace identifier, to identify from where the message has originated;
  a time-stamp for auditing and also to help check for stale, long running connections.

In the background extension (B), an initialise message is sent from the background JavaScript extension to a Safari extension JavaScript API facade 77 (STEP 1310). An asynchronous "initialise" message is sent to the JavaScript/objective-c message routing module 71 with the dataA (STEP 1320). The dataB is thereafter sent to an XMLHttpRequest module 79 (asynchronous onreadystatechange=null) (STEP 1330); and an HTTP Post sent to an iOS Foundation Framework 81 (STEP 1340). A startLoading instruction is sent to the HTTP interceptor module 57 (STEP 1350). An asynchronous message "initialise" is sent with the dataA to the message routing module 71. The dataB can also include data used in step 1320, for example: the original message name from STEP 1310 (in this example, "initialise"); dataA; and the destination namespace identifier.

In the foreground extension (F), a waitForMessage is sent from the Safari extension JavaScript API façade 77 to the JavaScript/objective-c message routing module 71 (STEP 1370). The dataC is sent to the XMLHttpRequest module 79 (asynchronous onreadystatechange=callback) (STEP 1380). An HTTP Post is sent to an iOS Foundation Framework 81 in the objective-c (STEP 1390). A startLoading instruction is sent to the HTTP interceptor module 57 (STEP 1400). A waitForMessage is sent to the message routing module 71 (STEP 1410).

A message 'initialise' and the dataA are returned in a response from the message routing module 71 (STEP 1420). A response object and the response dataB are returned to the iOS Foundation Framework 81 (STEP 1430); and an HTTP response is returned to the XMLHttpRequest module 79 (STEP 1440). A callback and the dataB is sent to the message routing module 71 (STEP 1450); and the message 'initialise' and the dataA sent to the Safari extension JavaScript API façade 77 (STEP 1460). A setFrameAndTabId message together with the dataA is sent to the extension JavaScript 73 (STEP 1470).

The response object returned from the HTTPInterceptor has to be specially created so that it is accepted by the XMLHttpRequest object; in particular, it must have the "Access-Control-Allow-Origin" HTTP header set to "*".

Although the present embodiment is described and illustrated herein as being implemented in an internet or network based system, the system described is provided as an example and not a limitation. As those skilled in the art will appreciate, the present examples are suitable for application in a variety of different types of computing systems and networks.

The term 'computer' is used herein to refer to any device with processing capability such that it can execute instructions. Those skilled in the art will realize that such processing capabilities are incorporated into many different devices and therefore the term 'computer' includes servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to operate the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity or with reference to one or more individual embodiments, those skilled in the art could make numerous alterations to the disclosed embodiment without departing from the spirit or scope of this invention.

The invention claimed is:

1. A method for obtaining audit information regarding user interaction with a web page via a browser, the method comprising:
  accessing a web page from a web server;
  parsing the web page into a document object model (DOM);

causing rendering of the DOM on a display as a rendered web page;

using a browser extension to listen for one or more user action DOM events derived from interaction between the user and the rendered web page without causing a corresponding call made to the web server;

in response to the browser extension detecting a user action DOM event derived from interaction between the user and the rendered web page without causing a corresponding call made to the web server, adding information about the user action DOM event to a configurable element within the DOM;

receiving a request for an audit trail from a server; and returning the information about the user action DOM event in the configurable element within the DOM to the server in response to the receiving of the request for an audit trail.

2. The method of claim 1, wherein the user action DOM event is a user selecting an on-screen button in the rendered web page.

3. The method of claim 1, wherein the user action DOM event is a mouse click by the user in the rendered web page.

4. The method of claim 1, wherein the user action DOM event is keyboard input by the user in the rendered web page.

5. The method of claim 1, wherein the returning includes serializing a plurality of pieces of information about user action DOM events stored in configurable elements in the DOM.

6. The method of claim 1, wherein the browser extension utilizes a list of one or more user action DOM events to listen for, the list corresponding to a security group in which the user is a member.

7. The method of claim 1, wherein the user action DOM event causes a modification to the DOM prior to the information about the user action DOM event being stored in the configurable element of the DOM.

8. An apparatus comprising:

one or more processors; and a memory including instructions executable by the one or more processor to configure a web browser to:

access a web page from a web server;

parse the web page into a document object model (DOM);

cause rendering of the DOM on a display as a rendered web page;

use a browser extension to listen for one or more user action DOM events derived from interaction between the user and the rendered web page without causing a corresponding call made to the web server;

in response to the browser extension detecting a user action DOM event derived from interaction between the user and the rendered web page without causing a corresponding call made to the web server, add information about the user action DOM event to a configurable element within the DOM;

receive a request for an audit trail from a server; and return the information about the user action DOM event in the configurable element within the DOM to the server in response to the receiving of the request for an audit trail.

9. The apparatus of claim 8, wherein the user action DOM event is a user selecting an on-screen button in the rendered web page.

10. The apparatus of claim 8, wherein the user action DOM event is a mouse click by the user in the rendered web page.

11. The apparatus of claim 8, wherein the user action DOM event is keyboard input by the user in the rendered web page.

12. The apparatus of claim 8, wherein the returning includes serializing a plurality of pieces of information about user action DOM events stored in configurable elements in the DOM.

13. The apparatus of claim 8, wherein the browser extension utilizes a list of one or more user action DOM events to listen for, the list corresponding to a security group in which the user is a member.

14. The apparatus of claim 8, wherein the user action DOM event causes a modification to the DOM prior to the information about the user action DOM event being stored in the configurable element of the DOM.

15. A non-transitory computer-readable storage medium storing a set of instructions that, when executed by a processor, cause the processor to perform operations comprising:

access a web page from a web server;

parsing the web page into a document object model (DOM);

case rendering of the DOM on a display as a rendered web page;

using a browser extension to listen for one or more user action DOM events derived from interaction between the user and the rendered web page without causing a corresponding call made to the web server;

in response to the browser extension detecting a user action DOM event derived from interaction between the user and the rendered web page without causing a corresponding call made to the web server, adding information about the user action DOM event to a configurable element within the DOM;

receiving a request for an audit trail from a server; and returning the information about the user action DOM event in the configurable element within the DOM to the server in response to the receiving of the request for an audit trail.

16. The non-transitory computer-readable storage medium of claim 15, wherein the user action DOM event is a user selecting an on-screen button in the rendered web page.

17. The non-transitory computer-readable storage medium of claim 15, wherein the user action DOM event is a mouse click by the user in the rendered web page.

18. The non-transitory computer-readable storage medium of claim 15, wherein the user action DOM event is keyboard input by the user in the rendered web page.

19. The non-transitory computer-readable storage medium of claim 15, wherein the returning includes serializing a plurality of pieces of information about user action DOM events stored in configurable elements in the DOM.

20. The non-transitory computer-readable storage medium of claim 15, wherein the browser extension utilizes a list of one or more user action DOM events to listen for, the list corresponding to a security group in which the user is a member.

* * * * *